(12) United States Patent
Morisaki et al.

(10) Patent No.: US 10,532,728 B2
(45) Date of Patent: Jan. 14, 2020

(54) HYBRID VEHICLE AND CONTROLLER FOR HYBRID VEHICLE

(71) Applicant: TOYOTA JIDOSHA KABUSHIKI KAISHA, Toyota-shi, Aichi-ken (JP)

(72) Inventors: Keisuke Morisaki, Toyota (JP); Takashi Ogura, Toyota (JP); Masahiro Kagami, Chiryu (JP); Koichiro Muta, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/129,246

(22) Filed: Sep. 12, 2018

(65) Prior Publication Data

US 2019/0168738 A1 Jun. 6, 2019

(30) Foreign Application Priority Data

Dec. 5, 2017 (JP) .................................. 2017-233641

(51) Int. Cl.
*B60W 20/13* (2016.01)
*B60K 6/20* (2007.10)
*B60W 10/08* (2006.01)
*B60W 10/06* (2006.01)
*G01C 21/34* (2006.01)

(52) U.S. Cl.
CPC .............. *B60W 20/13* (2016.01); *B60K 6/20* (2013.01); *B60W 10/06* (2013.01); *B60W 10/08* (2013.01); *G01C 21/3484* (2013.01); *B60W 2510/246* (2013.01)

(58) Field of Classification Search
CPC ...... B60W 20/13; B60W 10/08; B60W 10/06; B60W 2510/246; B60W 20/12; B60W 20/16; B60W 2510/248; B60W 2530/14; B60W 2710/244; B60W 50/0097; B60W 10/26; B60W 30/194; G01C 21/3484; B60K 6/20; B60K 6/445
See application file for complete search history.

(56) References Cited

U.S. PATENT DOCUMENTS

| 8,798,830 B2 * | 8/2014 | Sobue | ................... | B60K 16/00 701/22 |
| 9,151,631 B2 * | 10/2015 | Lee | ..................... | G01C 21/3469 |
| 9,713,962 B2 * | 7/2017 | Payne | ................. | B60L 11/1838 |

(Continued)

FOREIGN PATENT DOCUMENTS

| JP | 2009-1049 A | 1/2009 |
| JP | 2013-74706 A | 4/2013 |

(Continued)

*Primary Examiner* — Tyler J Lee
(74) *Attorney, Agent, or Firm* — Sughrue Mion, PLLC

(57) ABSTRACT

A hybrid vehicle includes an engine, a motor, a power storage device, and an electronic control unit. The electronic control unit is configured to limit execution of power storage capacity decreasing control and execution of power storage capacity recovering control when a condition a) and a condition b) are both satisfied than when the condition a) and a condition c) are both satisfied, a) is parking at a predetermined point is predicted b) a temperature of the power storage device is out of a predetermined temperature range, and c) the temperature of the power storage device is within the predetermined temperature range.

14 Claims, 11 Drawing Sheets

(56) References Cited

U.S. PATENT DOCUMENTS

| | | | |
|---|---|---|---|
| 9,963,042 B2* | 5/2018 | Igarashi | H02J 7/041 |
| 10,339,621 B2* | 7/2019 | Hirose | G06Q 10/06311 |
| 2011/0202221 A1* | 8/2011 | Sobue | B60K 16/00 |
| | | | 701/22 |
| 2015/0061550 A1* | 3/2015 | Schulz | H02P 3/14 |
| | | | 318/376 |
| 2016/0137185 A1 | 5/2016 | Morisaki | |
| 2017/0120888 A1 | 5/2017 | Jinno | |

FOREIGN PATENT DOCUMENTS

| | | |
|---|---|---|
| JP | 2016-135651 A | 7/2016 |
| JP | 2017-081416 A | 5/2017 |
| WO | 2015/004782 A1 | 1/2015 |

* cited by examiner

HYBRID VEHICLE AND CONTROLLER FOR HYBRID VEHICLE

INCORPORATION BY REFERENCE

The disclosure of Japanese Patent Application No. 2017-233641 filed on Dec. 5, 2017 including the specification, drawings and abstract is incorporated herein by reference in its entirety.

BACKGROUND

1. Technical Field

The disclosure relates to a hybrid vehicle and a controller for the hybrid vehicle, and more particularly, to a hybrid vehicle including an engine, a motor, and a power storage device and a controller for the hybrid vehicle.

2. Description of Related Art

A hybrid vehicle that includes an engine, a motor, and a battery and controls the engine and the motor such that the vehicle travels while a state of charge of the battery becomes a target state of charge has been proposed in which the target state of charge of the battery is changed from a basic target state of charge to a special target state of charge less than the basic target state of charge when the hybrid vehicle has reached a point a predetermined distance before a parking point (a destination) at which a parking duration is predicted to be longer than a predetermined period in a traveling route of the hybrid vehicle and the target state of charge is returned to the basic target state of charge when the hybrid vehicle restarts from the parking point in a next trip (for example, see Japanese Unexamined Patent Application Publication No. 2017-81416 (JP 2017-81416 A)). In such a hybrid vehicle, the state of charge of the battery at the time of restarting from a parking point can be set to be satisfactorily lower than the basic target state of charge (to the vicinity of the special target state of charge) through such control. Accordingly, at the time of engine running (cold running) additionally serving as warm-up, a load is applied to the engine to enhance charging (cold charging) efficiency of the battery.

SUMMARY

As in the above-mentioned hybrid vehicle, when decrease control of changing the target state of charge from the basic target state of charge to the special target state of charge is first performed and then recovery control of returning the target state of charge to the basic target state of charge is performed, the state of charge of the battery changes to a certain extent. Accordingly, there may be a problem in that deterioration of the battery is accelerated or energy efficiency of the vehicle as a whole is decreased.

A hybrid vehicle and a controller for the hybrid vehicle according to the disclosure curb occurrence of a problem due to execution of control of decreasing a power storage capacity of a power storage device.

A first aspect of the disclosure provides a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) limit execution of the power storage capacity decreasing control and execution of the power storage capacity recovering control to a greater extent when a condition a) and a condition b) are both satisfied than when the condition a) and a condition c) are both satisfied, a) parking at a predetermined point is predicted, b) a temperature of the power storage device is out of a predetermined temperature range, and c) the temperature of the power storage device is within the predetermined temperature range. The power storage capacity decreasing control is control of controlling the engine and the motor such that a power storage capacity of the power storage device is lower when the condition a) is satisfied than that when the condition a) is not satisfied. The power storage capacity recovering control is control of controlling the engine and the motor such that the power storage capacity of the power storage device is recovered when the engine operates.

With this configuration, when parking at a predetermined point is predicted, the power storage capacity decreasing control of controlling the engine and the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parking at the predetermined point is predicted and the temperature of the power storage device is out of the predetermined temperature range, execution of the power storage capacity decreasing control and the power storage capacity recovering control is limited compared with when the temperature is within the predetermined temperature range. When the power storage device is at a high temperature (on a side higher than the predetermined temperature range), deterioration of the power storage device is likely to be accelerated with charging and discharging of the power storage device. When the power storage device is at a low temperature (on a side lower than the predetermined temperature range), internal resistance of the power storage device is large, thus a loss when the power storage device is subjected to charging and discharging is likely to increase, and energy efficiency of the vehicle as a whole is likely to decrease. When the power storage capacity decreasing control and the power storage capacity recovering control are executed, the power storage device is likely to be subjected to charging and discharging with a relatively great power in order to change the power storage capacity of the power storage device. Accordingly, when the temperature of the power storage device is on the side higher than the predetermined temperature range and execution of the power storage capacity decreasing control and the power storage capacity recovering control is limited, it is possible to curb acceleration of deterioration of the power storage device. When the temperature of the power storage device is on the side lower than the predetermined temperature range and execution of the power storage capacity decreasing control and the power storage capacity recovering control is limited, it is possible to curb a loss due to charging and discharging of the power storage device and to curb a decrease in energy efficiency of the vehicle as a whole. Here, "limiting of execution of the power storage capacity decreasing control and the power storage capacity recovering control" includes execution of second power storage capacity decreasing control and second power storage capacity recovering control of limiting an amount of decreased power storage capacity and an amount of recovered power storage capacity of the power storage device compared with the power storage capacity decreasing control and the power storage capacity recovering control and prohibition of execution of the power storage capacity decreasing control and the power storage capacity recovering control.

In the hybrid vehicle, the electronic control unit may be configured to prohibit execution of the power storage capacity decreasing control and execution of the power storage capacity recovering control when the condition a) and the condition b) are both satisfied. With this configuration, when the temperature of the power storage device is on the side higher than the predetermined temperature range, it is possible to further curb acceleration of deterioration of the power storage device. When the temperature of the power storage device is on the side lower than the predetermined temperature range, it is possible to further curb a loss due to charging and discharging of the power storage device and to achieve further improvement in energy efficiency.

A second aspect of the disclosure provides a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) when the condition a) is satisfied, limit execution of the power storage capacity decreasing control and execution of the power storage capacity recovering control to a greater extent as an absolute value of a predetermined power of the power storage device decreases, a) parking at a predetermined point is predicted. The power storage capacity decreasing control is control of controlling the engine and the motor such that a power storage capacity of the power storage device is lower when the condition a) is satisfied than when the condition a) is not satisfied. The power storage capacity recovering control is control of controlling the engine and the motor such that the power storage capacity of the power storage device is recovered when the engine operates. The absolute value of the predetermined power is one of an absolute value of an allowable input power and an absolute value of an allowable output power.

With this configuration, when parking at a predetermined point is predicted, the power storage capacity decreasing control of controlling the engine and the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parking at the predetermined point is predicted and the allowable input power or the allowable output power of the power storage device is small, execution of the power storage capacity decreasing control and the power storage capacity recovering control is limited compared with when the allowable input power or the allowable output power is large. When the allowable input power or the allowable output power of the power storage device is small and the power storage capacity decreasing control and the power storage capacity recovering control are executed, the charging/discharging power of the power storage device is limited relatively greatly and thus there is a likelihood that energy efficiency of the vehicle as a whole will decrease. On the other hand, when the allowable input power or the allowable output power of the power storage device is small, it is possible to curb a decrease in energy efficiency of the vehicle as a whole by limiting execution of the power storage capacity decreasing control and the power storage capacity recovering control compared with when the allowable input power or the allowable output power is large. Here, "limiting of execution of the power storage capacity decreasing control and the power storage capacity recovering control" includes execution of second power storage capacity decreasing control and second power storage capacity recovering control of limiting an amount of decreased power storage capacity and an amount of recovered power storage capacity of the power storage device compared with the power storage capacity decreasing control and the power storage capacity recovering control and prohibition of execution of the power storage capacity decreasing control and the power storage capacity recovering control.

In the hybrid vehicle, the electronic control unit may be configured to prohibit execution of the power storage capacity decreasing control and execution of the power storage capacity recovering control when the condition a) and a condition d) are both satisfied, d) the predetermined power of the power storage device is less than a threshold value. With this configuration, when the allowable input power or the allowable output power of the power storage device is less than a threshold value, it is possible to further curb a decrease in energy efficiency of the vehicle as a whole.

A third aspect of the disclosure provides a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) when the condition a) is satisfied, limit execution of the power storage capacity decreasing control and execution of the power storage capacity recovering control to a greater extent as a deterioration level of the power storage device increases, a) parking at a predetermined point is predicted. The power storage capacity decreasing control is control of controlling the engine and the motor such that a power storage capacity of the power storage device is lower when the condition a) is satisfied than when the condition a) is not satisfied. The power storage capacity recovering control is control of controlling the engine and the motor such that the power storage capacity of the power storage device is recovered when the engine operates.

With this configuration, when parking at a predetermined point is predicted, the power storage capacity decreasing control of controlling the engine and the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parking at the predetermined point is predicted and the deterioration level of the power storage device is large, execution of the power storage capacity decreasing control and the power storage capacity recovering control is limited compared with when the deterioration level is small. When the deterioration level of the power storage device is large and the power storage capacity decreasing control and the power storage capacity recovering control are executed, deterioration of the power storage device is likely to be accelerated. On the other hand, when the deterioration level of the power storage device is large, it is possible to curb acceleration of deterioration of the power storage device by limiting execution of the power storage capacity decreasing control and the power storage capacity recovering control compared with when the deterioration level of the power storage device is small. Here, "limiting of execution of the power storage capacity decreasing control and the power storage capacity recovering control" includes execution of second power storage capacity decreasing control and second power storage capacity recovering control of limiting an amount of decreased power storage capacity and an amount of recovered power storage capacity of the power storage device compared with the power storage capacity decreasing control and the power storage capacity recovering control and prohibition of execution of the power storage capacity decreasing control and the power storage capacity recovering control.

In the hybrid vehicle, the electronic control unit may be configured to limit execution of the power storage capacity decreasing control and execution of the power storage capacity recovering control the condition a) and a condition e) are both satisfied, e) the deterioration level of the power storage device is larger than a predetermined deterioration level. With this configuration, when the deterioration level of the power storage device is greater than the predetermined deterioration level, it is possible to further curb acceleration of deterioration of the power storage device.

In the hybrid vehicle, the electronic control unit may be configured to notify of a message indicating limiting of execution of the power storage capacity decreasing control and execution of the power storage capacity recovering control when a condition f) is satisfied, f) execution of the power storage capacity decreasing control and execution of the power storage capacity recovering control are scheduled to be limited. With this configuration, it is possible to enable a user to recognize that execution of the power storage capacity decreasing control is scheduled to be limited.

In the hybrid vehicle, the electronic control unit may be configured not to limit execution of the power storage capacity decreasing control and the power storage capacity recovering control when the condition f) and a condition g) are both satisfied, g) rejection of limiting of execution of the power storage capacity decreasing control is instructed. With this configuration, it is possible to reflect a user's intention.

In the hybrid vehicle, the electronic control unit may be configured to determine whether parking at the predetermined point is predicted based on whether a destination is the predetermined point. The electronic control unit may be configured to acquire a destination that is predicted based on a traveling history by an external system when a destination has not been set by a user. With this configuration, even when a destination has not been set by a user, it is possible to determine whether parking at the predetermined point is predicted by acquiring a predicted destination form an external system (for example, a cloud server)

The hybrid vehicle may be a vehicle which is not able to use external charging. The external charging may be charging of the power storage device using electric power from an external power supply. The hybrid vehicle may be a vehicle that is able to use external charging. The predetermined point may be a position at which the vehicle is predicted not to use external charging. With this configuration, when external charging is performed during parking at the predetermined point, there is little necessity for execution of the power storage capacity decreasing control before parking at the predetermined point.

A fourth aspect of the disclosure provides a controller for a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) limit execution of the power storage capacity decreasing control and execution of the power storage capacity recovering control to a greater extent when a condition a) and a condition b) are both satisfied than when the condition a) and a condition c) are both satisfied, a) parking at a predetermined point is predicted, b) a temperature of the power storage device is out of a predetermined temperature range, and c) the temperature of the power storage device is within the predetermined temperature range. The power storage capacity decreasing control is control of controlling the engine and the motor such that a power storage capacity of the power storage device is lower when the condition a) is satisfied than when the condition a) is not satisfied. The power storage capacity recovering control is control of controlling the engine and the motor such that the power storage capacity of the power storage device is recovered when the engine operates.

With this configuration, when parking at a predetermined point is predicted, the power storage capacity decreasing control of controlling the engine and the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parking at the predetermined point is predicted and the temperature of the power storage device is out of the predetermined temperature range, execution of the power storage capacity decreasing control and the power storage capacity recovering control is limited compared with when the temperature is within the predetermined temperature range. When the power storage device is at a high temperature (on a side higher than the predetermined temperature range), deterioration of the power storage device is likely to be accelerated with charging and discharging of the power storage device. When the power storage device is at a low temperature (on a side lower than the predetermined temperature range), internal resistance of the power storage device is large, thus a loss when the power storage device is subjected to charging and discharging is likely to increase, and energy efficiency of the vehicle as a whole is likely to decrease. When the power storage capacity decreasing control and the power storage capacity recovering control are executed, the power storage device is likely to be subjected to charging and discharging with a relatively great power in order to change the power storage capacity of the power storage device. Accordingly, when the temperature of the power storage device is on the side higher than the predetermined temperature range and execution of the power storage capacity decreasing control and the power storage capacity recovering control is limited, it is possible to curb acceleration of deterioration of the power storage device. When the temperature of the power storage device is on the side lower than the predetermined temperature range and execution of the power storage capacity decreasing control and the power storage capacity recovering control is limited, it is possible to curb a loss due to charging and discharging of the power storage device and to curb a decrease in energy efficiency of the vehicle as a whole. Here, "limiting of execution of the power storage capacity decreasing control and the power storage capacity recovering control" includes execution of second power storage capacity decreasing control and second power storage capacity recovering control of limiting an amount of decreased power storage capacity and an amount of recovered power storage capacity of the power storage device compared with the power storage capacity decreasing control and the power storage capacity recovering control and prohibition of execution of the power storage capacity decreasing control and the power storage capacity recovering control.

A fifth aspect of the disclosure provides a controller for a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) when the condition a) is satisfied, limit execution of the power storage capacity decreasing control and execution of the power storage capacity recovering control to a greater extent as an absolute value of a predetermined power of the power storage device decreases, a) parking at a predetermined point is predicted, The power storage capacity decreasing control is control of controlling the engine and the motor such that a power storage capacity of the power storage device is lower when the condition a) is satisfied than when the condition a) is not satisfied, The power storage capacity recovering control is control of controlling the engine and the motor such that the power storage capacity of the power storage device is recovered when the engine operates.

With this configuration, when parking at a predetermined point is predicted, the power storage capacity decreasing control of controlling the engine and the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parking at the predetermined point is predicted and the allowable input power or the allowable output power of the power storage device is small, execution of the power storage capacity decreasing control and the power storage capacity recovering control is limited compared with when the allowable input power or the allowable output power is large. When the allowable input power or the allowable output power of the power storage device is small and the power storage capacity decreasing control and the power storage capacity recovering control are executed, the charging/discharging power of the power storage device is limited relatively greatly and thus there is a likelihood that energy efficiency of the vehicle as a whole will decrease. On the other hand, when the allowable input power or the allowable output power of the power storage device is small, it is possible to curb a decrease in energy efficiency of the vehicle as a whole by limiting execution of the power storage capacity decreasing control and the power storage capacity recovering control compared with when the allowable input power or the allowable output power is large. Here, "limiting of execution of the power storage capacity decreasing control and the power storage capacity recovering control" includes execution of second power storage capacity decreasing control and second power storage capacity recovering control of limiting an amount of decreased power storage capacity and an amount of recovered power storage capacity of the power storage device compared with the power storage capacity decreasing control and the power storage capacity recovering control and prohibition of execution of the power storage capacity decreasing control and the power storage capacity recovering control.

A sixth aspect of the disclosure provides a controller for a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) when the condition a) is satisfied, limit execution of the power storage capacity decreasing control and execution of the power storage capacity recovering control to a greater extent as a deterioration level of the power storage device increases, a) parking at a predetermined point is predicted. The power storage capacity decreasing control is control of controlling the engine and the motor such that a power storage capacity of the power storage device is lower when the condition a) is satisfied than when the condition a) is not satisfied. The power storage capacity recovering control is control of controlling the engine and the motor such that the power storage capacity of the power storage device is recovered when the engine operates.

With this configuration, when parking at a predetermined point is predicted, the power storage capacity decreasing control of controlling the engine and the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parking at the predetermined point is predicted and the deterioration level of the power storage device is large, execution of the power storage capacity decreasing control and the power storage capacity recovering control is limited compared with when the deterioration level is small. When the deterioration level of the power storage device is large and the power storage capacity decreasing control and the power storage capacity recovering control are executed, deterioration of the power storage device is likely to be accelerated. On the other hand, when the deterioration level of the power storage device is large, it is possible to curb acceleration of deterioration of the power storage device by limiting execution of the power storage capacity decreasing control and the power storage capacity recovering control compared with when the deterioration level of the power storage device is small. Here, "limiting of execution of the power storage capacity decreasing control and the power storage capacity recovering control" includes execution of second power storage capacity decreasing control and second power storage capacity recovering control of limiting an amount of decreased power storage capacity and an amount of recovered power storage capacity of the power storage device compared with the power storage capacity decreasing control and the power storage capacity recovering control and prohibition of execution of the power storage capacity decreasing control and the power storage capacity recovering control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
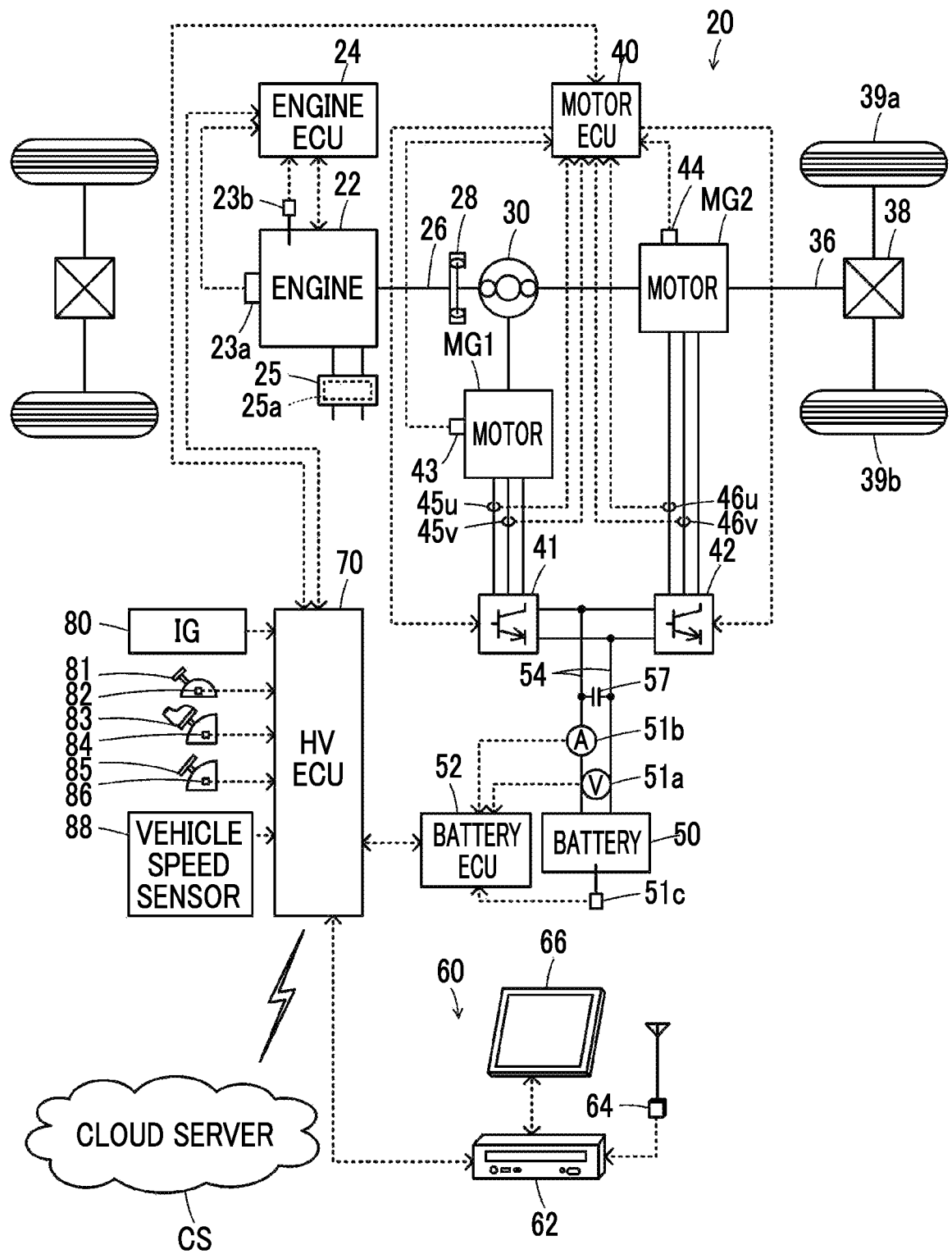
FIG. 1 is a diagram schematically illustrating a configuration of a hybrid vehicle 20 according to an embodiment of the invention.

FIG. 1 is a diagram schematically illustrating a configuration of a hybrid vehicle 20 according to an embodiment of the invention. As illustrated in the drawing, the hybrid vehicle 20 according to the embodiment includes an engine 22, a planetary gear 30, motors MG1 and MG2, inverters 41 and 42, a battery 50 as a power storage device, an onboard navigation device 60, and a hybrid electronic control unit (hereinafter referred to as an "HVECU") 70.

The engine 22 is configured as an internal combustion engine that outputs power using gasoline, diesel, or the like as fuel and is connected to a carrier of a planetary gear 30 via a damper 28. A purifier 25 including a catalyst 25a that purifies exhaust gas from the engine 22 is attached to an exhaust system of the engine 22. Operation of the engine 22 is controlled by an engine electronic control unit (hereinafter referred to as an "engine ECU") 24.

Although not illustrated in the drawing, the engine ECU 24 is configured as a microprocessor such as a CPU, and includes a ROM that stores a processing program, a RAM that temporarily stores data, input and output ports, and a communication port in addition to the CPU. Signals from various sensors which are required for controlling operation of the engine 22, for example, a crank angle $\theta cr$ from a crank position sensor 23a that detects a rotational position of a crank shaft 26 of the engine 22 and a coolant temperature Tw from a coolant temperature sensor 23b that detects a temperature of a coolant of the engine 22, are input to the engine ECU 24 via the input port. Various control signals for controlling operation of the engine 22 are output from the engine ECU 24 via the output port. The engine ECU 24 is connected to the HVECU 70 via the communication port. The engine ECU 24 calculates a rotation speed Ne of the engine 22 based on the crank angle $\theta cr$ from the crank position sensor 23a or estimates a temperature (a catalyst temperature) Tc of the catalyst 25a based on the coolant temperature Tw from the coolant temperature sensor 23b.

The planetary gear 30 is configured as a single pinion type planetary gear mechanism. A rotor of the motor MG1 is connected to a sun gear of the planetary gear 30. A drive shaft 36 connected to driving wheels 39a and 39b via a differential gear 38 is connected to a ring gear of the planetary gear 30. The crank shaft 26 of the engine 22 is connected to a carrier of the planetary gear 30 via the damper 28 as described above.

The motor MG1 is configured, for example as a synchronous generator motor and the rotor thereof is connected to the sun gear of the planetary gear 30 as described above. The motor MG2 is configured, for example as a synchronous generator motor and a rotor thereof is connected to the drive shaft 36. The inverters 41 and 42 are used to drive the motors MG1 and MG2 and are connected to the battery 50 via a power line 54. A smoothing capacitor 57 is attached to the power line 54. The motors MG1 and MG2 are rotationally driven by causing a motor electronic control unit (hereinafter referred to as a "motor ECU") 40 to control switching of a plurality of switching elements which is not illustrated in the inverters 41 and 42.

Although not illustrated in the drawing, the motor ECU 40 is configured as a microprocessor such as a CPU, and includes a ROM that stores a processing program, a RAM that temporarily stores data, input and output ports, and a communication port in addition to the CPU. Signals from various sensors which are required for controlling operation of the motors MG1 and MG2, for example, rotational positions $\theta m1$ and $\theta m2$ from rotational position sensors 43 and 44 that detect rotational positions of the rotors of the motors MG1 and MG2 and phase currents Iu1, Iv1, Iu2, and Iv2 from current sensors 45u, 45v, 46u, and 46v that detect currents flowing by phases of the motors MG1 and MG2, are input to the motor ECU 40 via the input port. Switching control signals to a plurality of switching elements of the inverters 41 and 42 and the like are output from the motor ECU 40 via the output port. The motor ECU 40 is connected to the HVECU 70 via the communication port. The motor ECU 40 calculates electrical angles $\theta e1$ and $\theta e2$, angular velocities $\omega m1$ and $\omega m2$, or rotation speeds Nm1 and Nm2 of the motors MG1 and MG2 based on the rotational positions $\theta m1$ and $\theta m2$ of the rotors of the motors MG1 and MG2 from the rotational position sensors 43 and 44.

The battery 50 is configured, for example, as a lithium-ion secondary battery or a nickel-hydride secondary battery and is connected to the power line 54. The battery 50 is controlled by a battery electronic control unit (hereinafter referred to as a "battery ECU") 52.

Although not illustrated in the drawing, the battery ECU 52 is configured as a microprocessor such as a CPU, and includes a ROM that stores a processing program, a RAM that temporarily stores data, input and output ports, and a communication port in addition to the CPU. Signals from various sensors which are required for controlling the battery 50 are input to the battery ECU 52 via the input port. Examples of the signals input to the battery ECU 52 include a voltage Vb of the battery 50 from a voltage sensor 51a that is attached between the terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a power storage capacity (State of Charge) SOC based on an integrated value of the current Ib of the battery 50 from the current sensor 51b or calculates input and output limits Win and Wout based on the calculated power storage capacity SOC and the temperature Tb of the battery 50 from the temperature sensor 51c. The power storage capacity SOC refers to a capacity of the capacity of electric power which can be discharged from the battery 50 to the total capacity of the battery 50. The input and output limits Win and Wout are allowable charging and discharging powers with which the battery 50 may be charged and discharged. The input and output limits Win and Wout of the battery 50 can be set to, for example, values obtained by setting basic values Wintmp and Wouttmp of the input and output limits Win and Wout based on the temperature Tb of the battery 50, setting correction coefficients kin and kout based on the power storage capacity SOC of the battery 50, and multiplying the basic values Wintmp and Wouttmp by the coefficients kin and kout. Specifically, the output limit Wout of the battery 50 decreases as the temperature Tb of the battery 50 moves to a higher side or a lower side from an allowable temperature range, and decreases as the power storage capacity SOC of the battery 50 decreases. The input limit Win of the battery 50 increases (the absolute value thereof decreases) as the temperature Tb of the battery 50 moves to a higher side or a lower side from the allowable temperature range, and increases (the absolute value thereof decreases) as the power storage capacity SOC of the battery 50 increases.

The onboard navigation device 60 includes a main body 62 that has a storage medium such as a hard disk in which map information or the like is stored or a control unit including input and output ports and a communication port built therein, a GPS antenna 64 that receives information on a current location of the vehicle, and a touch panel type display 66 that displays the information of the current location of the vehicle, a scheduled traveling route to a destination, or the like and can receive various instructions from a user. In the map information, service information (for example, sightseeing information or parking lots), road information of predetermined traveling sections (for example, signaling periods or distance between intersections), and the like are stored as a database. The road information includes distance information, road width information, lane number information, region information (downtown or outskirt), road type information (regular roads, expressways, or toll roads), gradient information, legal speed limits, and the number of signals. The onboard navigation device 60 is connected to the HVECU 70 via the communication port.

When the display 66 is operated to set a destination by a user, the onboard navigation device 60 sets a scheduled traveling route from a current location to a destination of the vehicle based on the map information and the current location and the destination of the vehicle, and displays the set scheduled traveling route on the display 66 to perform route guidance.

Although not illustrated in the drawing, the HVECU 70 is configured as a microprocessor such as a CPU, and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. As described above, the HVECU 70 is connected to the engine ECU 24, the motor ECU 40, the battery ECU 52, and the onboard navigation device 60 via the communication port. The HVECU 70 is configured to communicate with the cloud server CS in a wireless manner.

The cloud server CS is configured to communicate with vehicles including the hybrid vehicle 20 and stores traveling history information of the vehicles. The traveling history information includes a parking position, a parking time, and a parking duration. In the following description, parking in which the parking duration is longer than a predetermined period T1 (for example, 5 hours, 6 hours, or 7 hours) is referred to as "long-term parking" and parking in which the parking duration is equal to or shorter than the predetermined period T1 is referred to as "short-term parking." A point at which the vehicle parked for a long term in a past trip is referred to as a "long-term parking point" and a point at which the vehicle parked for a short term in a past trip is referred to as a "short-term parking point." When a certain point corresponds to both the long-term parking point and the short-term parking point, the point may be set to the long-term parking point or the short-term parking point depending on a day of the week or a time line or may be set to the long-term parking point or the short-term parking point depending on an average parking duration or the like. The predetermined period T1 is determined, for example, as a period of time in which the engine 22 or the catalyst 25a is sufficiently cooled, and a fixed period of time may be used or a period of time varying depending on the atmospheric temperature or the like may be used.

The cloud server CS predicts a destination (an arrival point) of the current trip from the long-term parking point or the short-term parking point based on the traveling history information or a start point of the trip (a departure point) for each vehicle. For example, when a departure point is point A (for example, home) before noon of weekdays, the cloud server CS predicts point B (for example, a company) as a destination. When a departure point is not point A after noon of weekdays or holidays, the cloud server CS predicts point A as a destination. When a departure point is point A after noon of week days or holidays, the cloud server CS is assumed not to predict a destination (to be unclear).

The hybrid vehicle 20 having the above-mentioned configuration travels in a hybrid traveling mode (HV traveling mode) in which the vehicle travels with the engine 22 operating and in an electric traveling mode (EV traveling mode) in which the vehicle travels with the engine 22 not operated.

Figure 2:
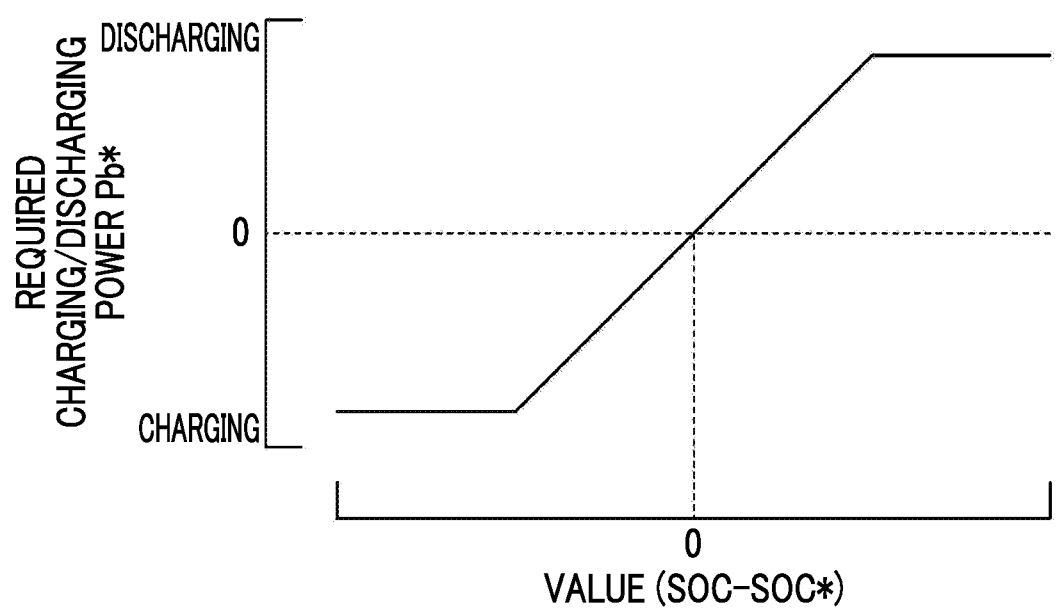
FIG. 2 is a diagram illustrating an example of a required charging/discharging power setting map.

In the HV traveling mode, the HVECU 70 sets a required torque Td* required for the drive shaft 36 based on the accelerator operation amount Acc and the vehicle speed V and calculates a required power Pd* required for the drive shaft 36 by multiplying the set required torque Td* by the rotation speed Nd of the drive shaft 36 (the rotation speed Nm2 of the motor MG2). Subsequently, the HVECU 70 sets a required charging/discharging power Pb* required for the battery 50 (which has a positive value when electric power is discharged from the battery 50) based on a power storage capacity SOC and a target capacity SOC* of the battery 50. The target capacity SOC* of the battery 50 is set by a target capacity setting routine which will be described later. The required charging/discharging power Pb* of the battery 50 is set such that a value (SOC−SOC*) obtained by subtracting the target capacity SOC* from the power storage capacity SOC of the battery 50 is close to zero (approaches zero). FIG. 2 is a diagram illustrating an example of a required charging/discharging power setting map. As illustrated in the drawing, the required charging/discharging power Pb* of the battery 50 is set to zero when the value (SOC−SOC*) is zero, is set to a value of which the absolute value increases within a positive range (within a discharging-side range) as the value (SOC−SOC*) increases when the value (SOC−SOC*) is positive, and is set to a value of which the absolute value increases within a negative range (within a charging-side range) as the value (SOC−SOC*) decreases when the value (SOC−SOC*) is negative.

Then, the HVECU 70 sets a required power Pe* required for the engine 22 by subtracting the required charging/discharging power Pb* of the battery 50 from the required power Pd*, and sets a target rotation speed Ne* or a target torque Te* of the engine 22 and torque commands Tm1* and Tm2* of the motors MG1 and MG2 such that the required power Pe* is output from the engine 22 and the required torque Td* is output to the drive shaft 36 within the range of the input and output limits Win and Wout of the battery 50. Subsequently, the HVECU 70 transmits the target rotation speed Ne* or the target torque Te* of the engine 22 to the engine ECU 24 and transmits the torque commands Tm1* and Tm2* of the motors MG1 and MG2 to the motor ECU 40. When the target rotation speed Ne* and the target torque Te* of the engine 22 are received, the engine ECU 24 performs operation control of the engine 22 (intake air control, fuel injection control, ignition control, and the like) such that the engine 22 operates based on the target rotation speed Ne* and the target torque Te*. When the torque command Tm1* and Tm2* of the motors MG1 and MG2 are received, the motor ECU 40 performs switching control of the switching elements of the inverters 41 and 42 such that the motors MG1 and MG2 operate in accordance with the torque commands Tm1* and Tm2*.

In the HV traveling mode, when all of a condition that the required power Pe* is less than a stopping threshold value Pstop, a condition that a warm-up request for the engine 22 or a warm-up request for the catalyst 25a is not issued, and a condition that a heating request for a passenger compartment with the engine 22 as a heat source is not issued have been satisfied, the HVECU 70 determines that a stopping condition of the engine 22 has been satisfied, and stops operation of the engine 22 to transition to the EV traveling mode. The warm-up request for the engine 22 is issued when the coolant temperature Tw of the engine 22 is less than a predetermined temperature Twref (for example, 70° C., 75° C., or 80° C.), and the warm-up request for the catalyst 25a is issued when a temperature (a catalyst temperature) Tc of the catalyst 25a is less than a predetermined temperature Tcref (for example, 350° C., 400° C., or 450° C.).

In the EV traveling mode, the HVECU 70 sets the required torque Td* required for the drive shaft 36 based on the accelerator operation amount Acc and the vehicle speed V, sets the torque command Tm1* of the motor MG1 to a value of 0, sets the torque command Tm2* of the motor MG2 such that the required torque Td* is output to the drive shaft 36 within the range of the input and output limits Win and Wout of the battery 50, and transmits the torque commands Tm1* and Tm2* of the motors MG1 and MG2 to the motor ECU 40. Control of the inverters 41 and 42 by the motor ECU 40 is the same as described above.

In the EV traveling mode, when at least one of a condition that the required power Pe* which is calculated in the same way as in the HV traveling mode is equal to or greater than a starting threshold value Pstart, a condition that a warm-up request for the engine 22 or a warm-up request for the catalyst 25a is issued, and a condition that a heating request for a passenger compartment is issued has been satisfied, the HVECU 70 determines that a starting condition of the engine 22 has been satisfied, and starts the engine 22 to transition to the HV traveling mode. In order to prevent starting and stopping of the engine 22 from being frequently performed for a short time, it is preferable that a value which is greater by a margin (for example, several kW) than the stopping threshold value Pstop be used as the starting threshold value Pstart.

Figure 3:
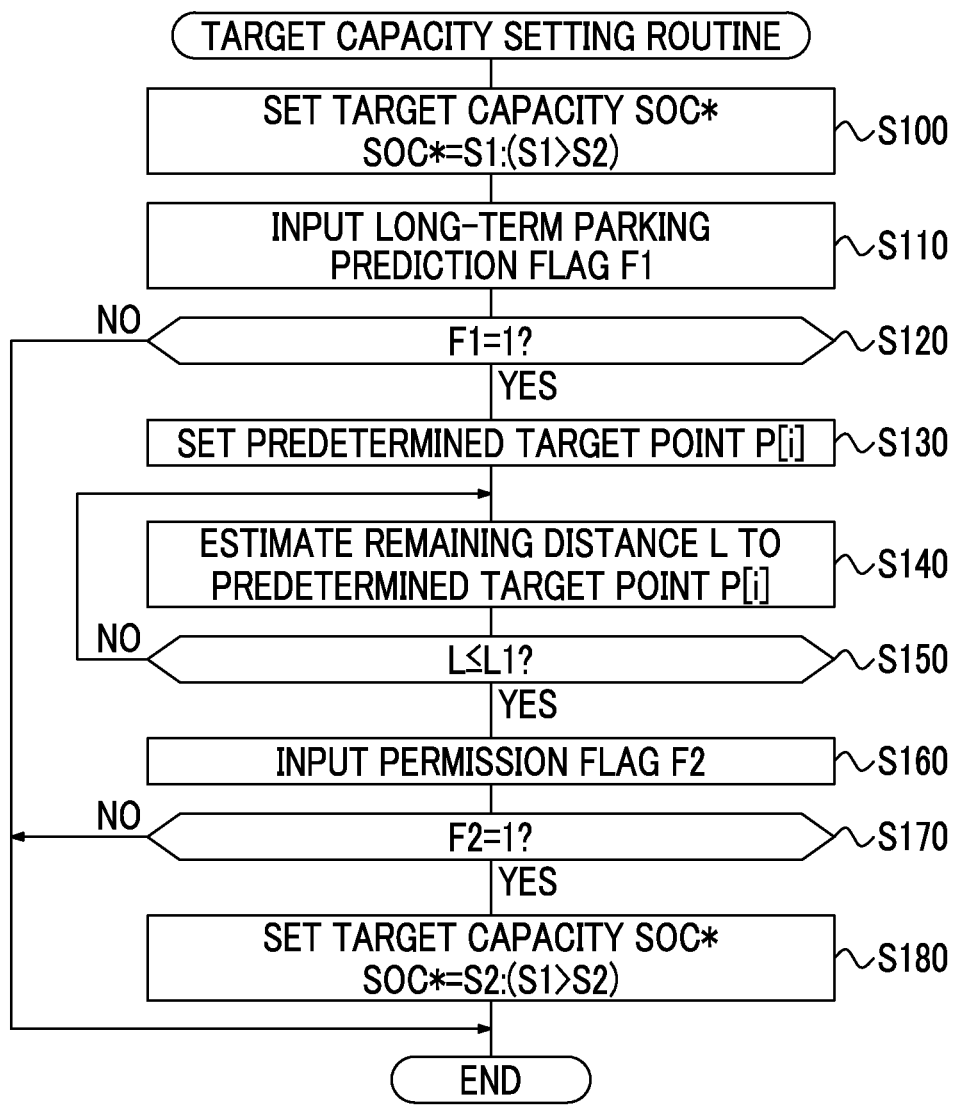
FIG. 3 is a flowchart illustrating an example of a target capacity setting routine which is performed by an HVECU 70.

Operations of the hybrid vehicle 20 according to the embodiment having the above-mentioned configuration, particularly, processes for setting the target capacity SOC* of the battery 50, will be described below. FIG. 3 is a flowchart illustrating an example of a target capacity setting routine which is performed by the HVECU 70. This routine is performed when a trip starts (when the ignition switch 80 is turned on).

When the target capacity setting routine illustrated in FIG. 3 is performed, the HVECU 70 sets the target capacity SOC* of the battery 50 to a predetermined value S1 (Step S100). For example, 58%, 60%, or 62% may be used as the predetermined value S1.

Subsequently, the HVECU 70 sets a long-term parking prediction flag F1 (Step S110) and checks the set value of the long-term parking prediction flag F1 (Step S120). Here, the long-term parking prediction flag F1 is set to 1 when long-term parking at a predetermined point is predicted, and is set to 0 when long-term parking at the predetermined point is not predicted. The "predetermined point" is a point at which there is a likelihood of long-term parking, and examples thereof include the home, a company, a shopping mall, a leisure facility, and a lodging facility. The "predetermined point" includes a point which is set (registered) in advance before shipment of the vehicle, a point which is set (registered) by causing a user to operate the display 66, or a long-term parking point which is input from the cloud server CS by wireless communication.

Determination of whether long-term parking at a predetermined point is predicted can be performed as follows. When a destination has been set by a user, it can be performed by determining whether the set destination is included in the predetermined point or whether a scheduled arrival time to the set destination is included in the day or the time line in which the long-term parking is predicted. On the other hand, when a destination has not been set by a user, it can be determined by determining whether a destination has been predicted by the cloud server CS, whether the predicted destination is included in the predetermined point, or whether a scheduled arrival time to the predicted destination included in the day or the time line in which the long-term parking is predicted. Since a certain period of time is required from a time point at which a trip starts to a time point at which destination is set by a user, the process of Step S110 may be performed when a destination has been set by a user, when a certain period of time has elapsed, or when the vehicle has traveled a certain distance after the process of Step S100 has been performed.

When it is checked in Step S120 that value of the long-term parking prediction flag F1 is 0, the HVECU 70 determines that long-term parking at the predetermined point is not predicted, and ends this routine. In this case, the target capacity SOC* of the battery 50 is maintained at the predetermined value S1 until the current trip ends.

When it is checked in Step S120 that the value of the long-term parking prediction flag F1 is 1, the HVECU 70 determines that long-term parking at the predetermined point is predicted, and sets the destination set by the user or the destination predicted by the cloud server CS as a predetermined target point P[i] (Step S130). Here, [i] is a number corresponding to the home, the company, the shopping mall, the leisure facility, the lodging facility, or the like.

Subsequently, the HVECU 70 estimates a remaining distance L to the predetermined target point P[i] based on the current location, the destination, and the map information (Step S140), compares the estimated remaining distance L with a predetermined distance L1 (for example, 3 km, 4 km, or 5 km) (Step S150), and returns to Step S140 when the remaining distance L is longer than the predetermined distance L1. The HVECU 70 repeatedly performs the processes of Steps S140 and S150 in this way, and waits until the remaining distance L to the predetermined target point P[i] becomes equal to or less than the predetermined distance L1.

When it is determined in Step S150 that the remaining distance L to the predetermined target point P[i] becomes equal to or less than the predetermined distance L1, the HVECU 70 sets a value of a permission flag F2 (Step S160), and checks the set value of the permission flag F2 (Step S170). Here, the permission flag F2 is set to 1 when execution of power storage capacity decreasing control and power storage capacity recovering control which will be described later is permitted, and is set to 0 when the execution is prohibited. The permission flag F2 is set by a permission flag setting routine which will be described later.

When it is checked in Step S170 that the value of the permission flag F2 is 1, the HVECU 70 determines that execution of the power storage capacity decreasing control and the power storage capacity recovering control is permitted, sets the target capacity SOC* of the battery 50 to a predetermined value S2 less than the predetermined value S1 (Step S180), and ends this routine. For example, 48%, 50%, or 52% may be used as the predetermined value S2.

In this case, when the remaining distance L to the predetermined target point P[i] in the current trip becomes equal to or less than the predetermined distance L1, the HVECU 70 executes the power storage capacity decreasing control of decreasing the power storage capacity SOC of the battery 50 by changing the target capacity SOC* of the battery 50 from the predetermined value S1 to the predetermined value S2. The HVECU 70 executes the power storage capacity recovering control of recovering the power storage capacity SOC of the battery 50 in the next trip by setting the target capacity SOC* of the battery 50 to the predetermined value S1 when the next trip starts. Here, "power storage capacity decreasing control" is specifically control of controlling the engine 22 or the motors MG1 and MG2 such that the power storage capacity SOC of the battery 50 changes from the vicinity of the predetermined value S1 to the vicinity of the predetermined value S2. "Power storage capacity recovering control" is specifically control of controlling the engine 22 or the motors MG1 and MG2 such that the power storage capacity SOC of the battery 50 changes from the vicinity of the predetermined value S2 to the vicinity of the predetermined value S1 after the power storage capacity decreasing control has been executed (in the next trip).

Figure 4:
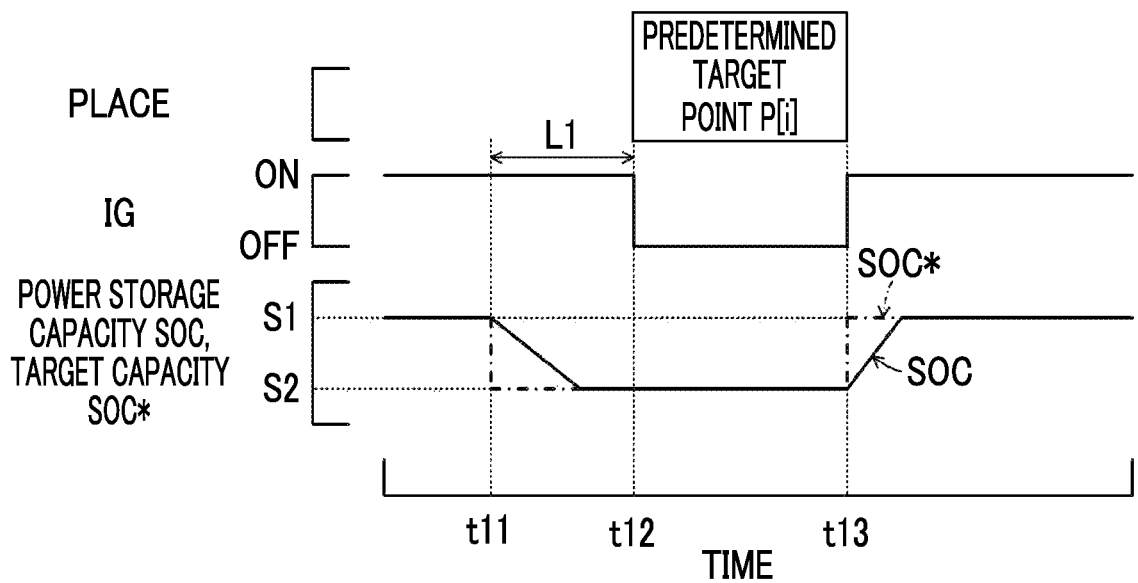
FIG. 4 is a diagram illustrating an example in which power storage capacity decreasing control and power storage capacity recovering control are executed.

FIG. 4 is a diagram illustrating an example in which power storage capacity decreasing control and power storage capacity recovering control are executed. When the remaining distance L to the predetermined target point P[i] in the current trip becomes equal to or less than the predetermined distance L1 (time t11), the power storage capacity SOC of the battery 50 at the time of end of the current trip (time t12) or at the time of start of the next trip (time t13) can be set to be lower (to get close to the predetermined value S2) by executing the power storage capacity decreasing control (changing the target capacity SOC* of the battery 50 from the predetermined value S1 to the predetermined value S2). Then, by executing the power storage capacity recovering control in the next trip (setting the target capacity SOC* of the battery 50 to the predetermined value S1) (from time t13), the power storage capacity SOC of the battery 50 can be recovered (to get close to the predetermined value S1). In comparison with a case in which the power storage capacity decreasing control is not executed in the current trip and thus the power storage capacity SOC of the battery 50 at the time of start of the next trip is high (close to the predetermined value S1), the required charging/discharging power Pb* of the battery 50 can be decreased (a charging-side value can be increased) to increase the required power Pe*, that is, the output of the engine 22, through this series of control when the engine 22 operates in response to a heating request for the passenger compartment, a warm-up request for the engine 22, a warm-up request for the catalyst 25a, or the like in the next trip. Accordingly, it is possible to charge the battery 50 while operating the engine 22 at an efficient operating point, securing a sufficient amount of heat for heating, or accelerating warm-up of the engine 22 or warm-up of the catalyst 25a. As a result, it is possible to achieve improvement in energy efficiency.

When it is checked in Step S170 of the target capacity setting routine illustrated in FIG. 3 that the value of the permission flag F2 is 0, the HVECU 70 determines that execution of the power storage capacity decreasing control and the power storage capacity recovering control is prohibited, does not perform the process of Step S180, and ends this routine. In this case, the target capacity SOC* of the battery 50 is maintained at the predetermined value S1 until the current trip ends. That is, the power storage capacity decreasing control is not executed in the current trip and the power storage capacity recovering control is not executed in the next trip.

Figure 5:
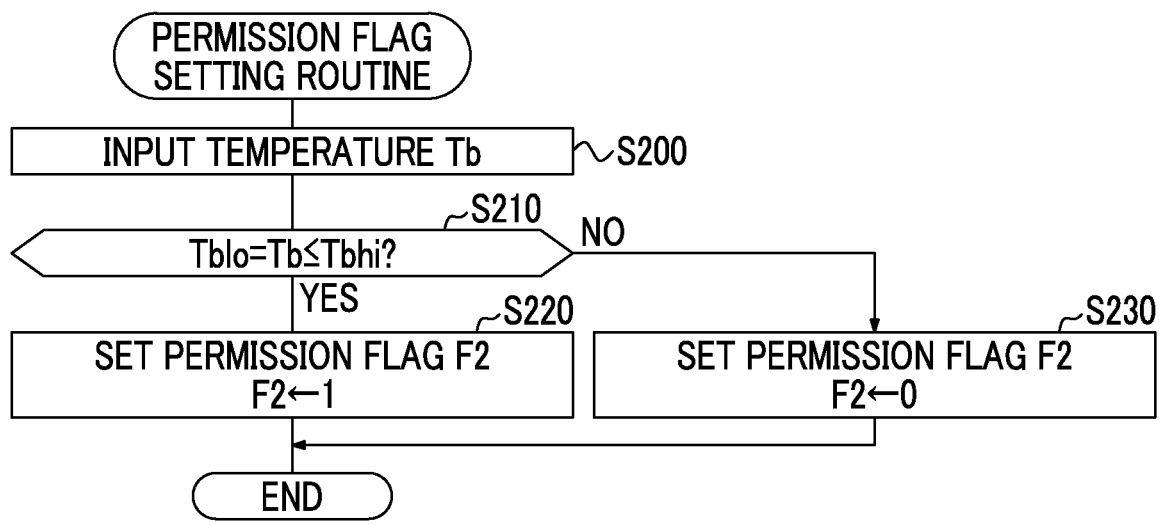
FIG. 5 is a flowchart illustrating an example of a permission flag setting routine which is performed by the HVECU 70.

Processes for setting the permission flag F2 will be described below. FIG. 5 is a flowchart illustrating an example of a permission flag setting routine which is performed by the HVECU 70. This routine is performed when the value of the long-term parking prediction flag F1 is 1 (when long-term parking at a predetermined point is predicted) and the remaining distance L to the predetermined target point P[i] becomes equal to or less than the predetermined distance L1 or a predetermined distance L2 slightly longer than the predetermined distance L1.

When the permission flag setting routine illustrated in FIG. 5 is performed, the HVECU 70 receives the temperature Tb of the battery 50 (Step S200), and compares the received temperature Tb of the battery 50 with a threshold value Tblo and a threshold value Tbhi higher than the threshold value Tblo (Step S210). Here, as the temperature Tb of the battery 50, a value detected by the temperature sensor 51c is input from the battery ECU 52 by communication. The threshold value Tblo of the battery 50 is set to a lower limit of a temperature range of the battery 50 in which it can be determined that internal resistance of the battery 50 is not large and a loss at the time of charging and discharging of the battery 50 is not great, and for example, −15° C., −10° C., or −5° C. is used. The threshold value Tbhi is set to an upper limit of a temperature range in which it can be determined that deterioration of the battery 50 is not accelerated with charging and discharging of the battery 50, and for example, 40° C., 45° C., or 50° C. is used.

When it is determined in Step S210 that the temperature Tb of the battery 50 is equal to or greater than the threshold value Tblo and equal to or less than the threshold value Tbhi, the HVECU 70 determines that a loss at the time of charging and discharging of the battery 50 is not greater and deterioration of the battery 50 is not accelerated with charging and discharging of the battery 50, determines that execution of the power storage capacity decreasing control and the power storage capacity recovering control is permitted, sets the value of the permission flag F2 to 1 (Step S220), and ends this routine.

When it is determined in Step S210 that the temperature Tb of the battery 50 is less than the threshold value Tblo or greater than the threshold value Tbhi, the HVECU 70 determines that a loss at the time of charging and discharging of the battery 50 is greater or deterioration of the battery 50 is accelerated with charging and discharging of the battery 50, determines that execution of the power storage capacity decreasing control and the power storage capacity recovering control is prohibited, sets the value of the permission flag F2 to 0 (Step S230), and ends this routine.

When the power storage capacity decreasing control and the power storage capacity recovering control are executed, charging and discharging of the battery 50 is likely to be performed with a relatively large power in order to change the power storage capacity SOC of the battery 50. When the temperature Tb of the battery 50 is less than the threshold value Tblo and the power storage capacity decreasing control and the power storage capacity recovering control are executed, a loss at the time of charging and discharging of the battery 50 is great and energy efficiency of the vehicle as a whole is likely to decrease. When the temperature Tb of the battery 50 is greater than the threshold value Tbhi and the power storage capacity decreasing control and the power storage capacity recovering control are executed, deterioration of the battery 50 is likely to be accelerated. On the other hand, in the embodiment, when the temperature Tb of the battery 50 is less than the threshold value Tblo, it is possible to curb a loss due to charging and discharging of the battery 50 and to curb a decrease in energy efficiency of the vehicle as a whole by prohibiting execution of the power storage capacity decreasing control and the power storage capacity recovering control. When the temperature Tb of the battery 50 is greater than the threshold value Tbhi, it is possible to curb acceleration of deterioration of the battery 50 by prohibiting execution of the power storage capacity decreasing control and the power storage capacity recovering control.

In the above-mentioned hybrid vehicle 20 according to the embodiment, when long-term parking at the predetermined target point P[i] is predicted and the temperature Tb of the battery 50 is less than the threshold value Tblo or greater than the threshold value Tbhi, execution of the power storage capacity decreasing control and the power storage capacity recovering control is prohibited. When the temperature Tb of the battery 50 is less than the threshold value Tblo, it is possible to curb a loss due to charging and discharging of the battery 50 and to curb a decrease in energy efficiency of the vehicle as a whole by prohibiting execution of the power storage capacity decreasing control and the power storage capacity recovering control. When the temperature Tb of the battery 50 is greater than the threshold value Tbhi, it is possible to curb acceleration of deterioration of the battery 50 by prohibiting execution of the power storage capacity decreasing control and the power storage capacity recovering control.

Figure 6:
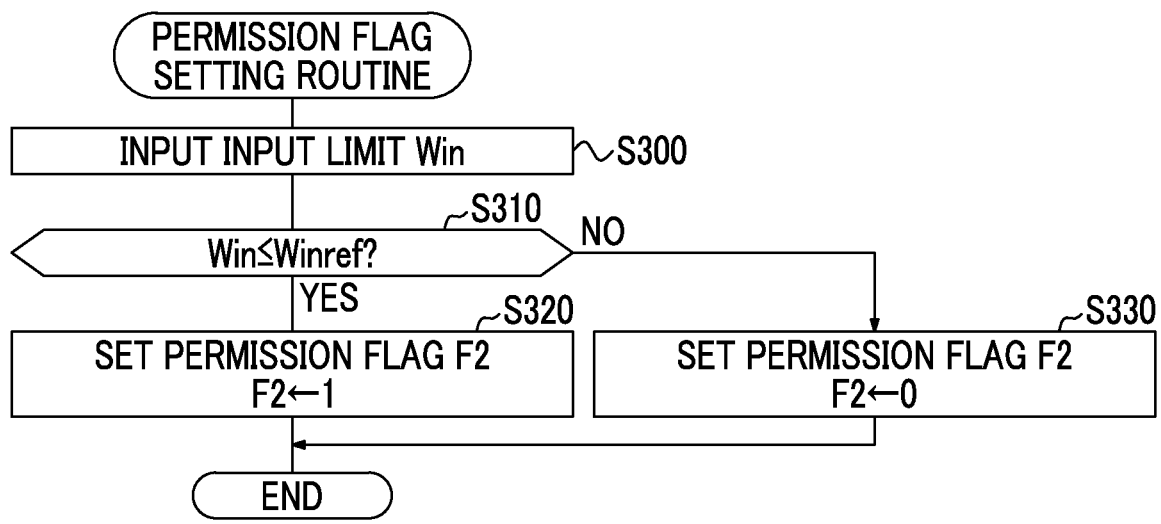
FIG. 6 is a flowchart illustrating an example of a permission flag setting routine according to a modified example.
Figure 7:
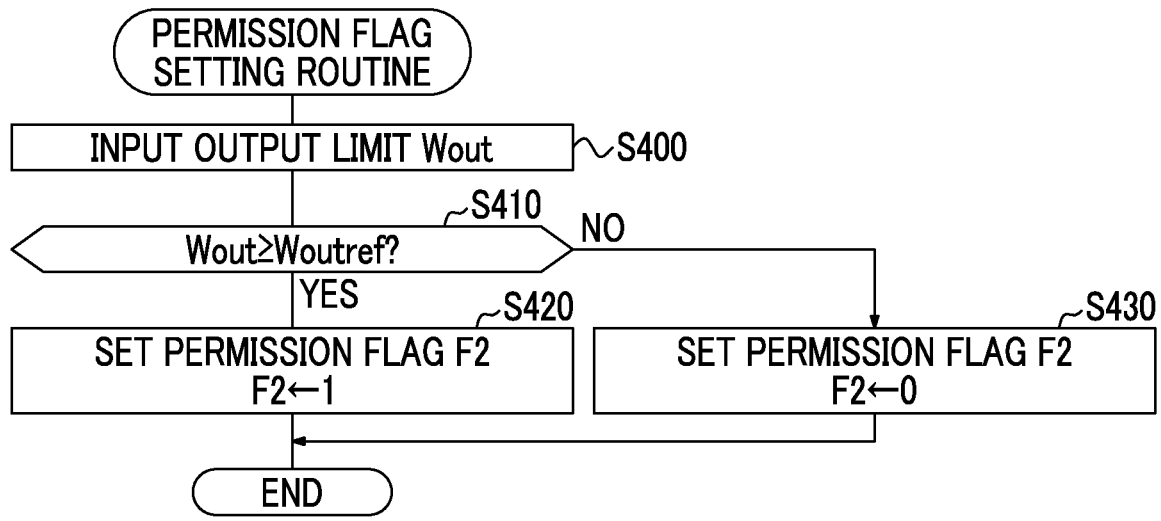
FIG. 7 is a flowchart illustrating an example of a permission flag setting routine according to a modified example.
Figure 8:
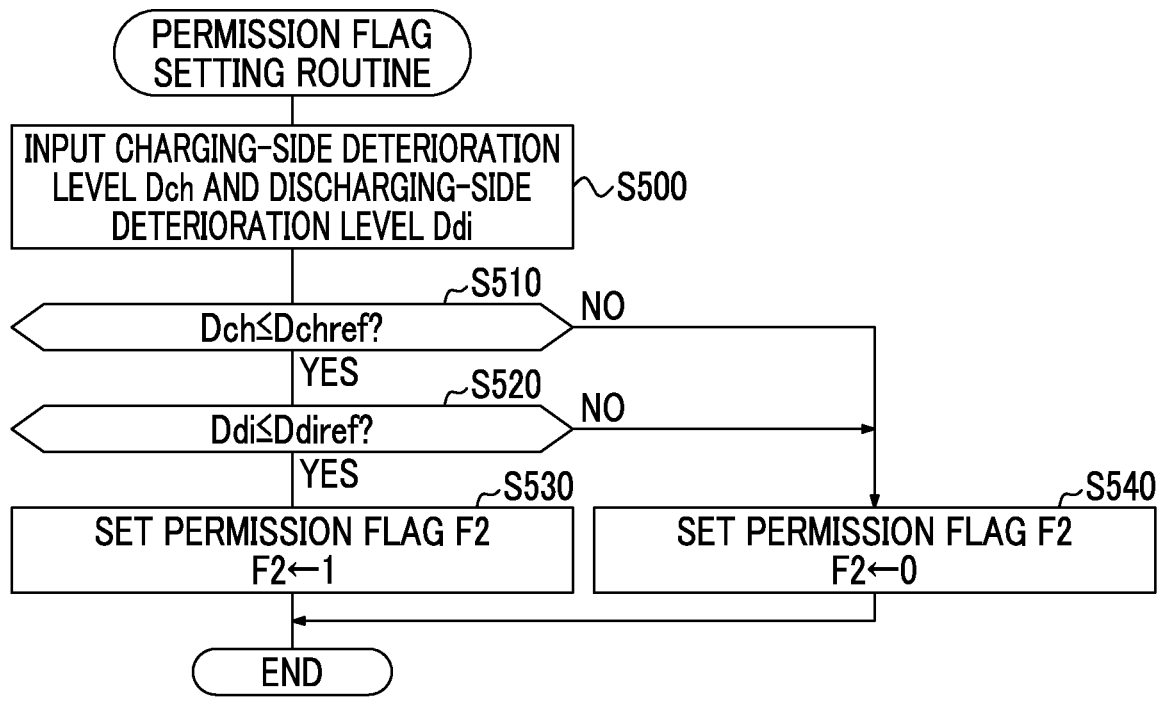
FIG. 8 is a flowchart illustrating an example of a permission flag setting routine according to a modified example.

In the hybrid vehicle 20 according to the embodiment, the HVECU 70 performs the permission flag setting routine illustrated in FIG. 5, but may perform a permission flag setting routine illustrated in FIG. 6, 7, or 8 instead thereof. These permission flag setting routines will be sequentially described below.

The permission flag setting routine illustrated in FIG. 6 will be described now. When the permission flag setting routine illustrated in FIG. 6 is performed, the HVECU 70 receives an input limit Win (a negative value, that is, a charging-side value) of the battery 50 (Step S300), and compares the received input limit Win of the battery 50 with a threshold value Winref (Step S310). Here, as the input limit Win of the battery 50, a value set based on the temperature Tb and the power storage capacity SOC of the battery 50 by the battery ECU 52 is input by communication. The threshold value Winref is set to an upper limit (a lower limit of the absolute value thereof) at which the battery 50 can be determined to be charged with certain high power, and for example, −3 kW, −5 kW, or −7 kW is used when the rated value of the input limit Win of the battery 50 is about −20 kW.

When it is determined in Step S310 that the input limit Win of the battery 50 is equal to or less than the threshold value Winref, the HVECU 70 determines that the battery 50 can be charged with certain high power, determines that execution of the power storage capacity decreasing control and the power storage capacity recovering control is permitted, sets the value of the permission flag F2 to 1 (Step S320), and ends this routine.

When it is determined in Step S310 that the input limit Win of the battery 50 is greater than the threshold value Winref (smaller in the absolute value), the HVECU 70 determines that the battery 50 cannot be charged with such high power, determines that execution of the power storage capacity decreasing control and the power storage capacity recovering control is prohibited, sets the value of the permission flag F2 to 0 (Step S330), and ends this routine.

When the power storage capacity decreasing control and the power storage capacity recovering control are executed, the battery 50 is likely to be charged with relatively high power, particularly, at the time of execution of the power storage capacity recovering control. When the input limit Win of the battery 50 is greater than the threshold value Winref and the power storage capacity decreasing control and the power storage capacity recovering control are executed, a charging power of the battery 50 is likely to be limited to the input limit Win and there is a likelihood that energy efficiency of the vehicle as a whole will decrease. On the other hand, in this modified example, when the input limit Win of the battery 50 is greater than the threshold value Winref, it is possible to curb a decrease in energy efficiency of the vehicle as a whole by prohibiting execution of the power storage capacity decreasing control and the power storage capacity recovering control.

The permission flag setting routine illustrated in FIG. 7 will be described now. When the permission flag setting routine illustrated in FIG. 7 is performed, the HVECU 70 receives an output limit Wout (a positive value, that is, a discharging-side value) of the battery 50 (Step S400), and compares the received output limit Wout of the battery 50 with a threshold value Woutref (Step S410). Here, as the output limit Wout of the battery 50, a value set based on the temperature Tb and the power storage capacity SOC of the battery 50 by the battery ECU 52 is input by communication. The threshold value Woutref is set to a lower limit at which the battery 50 can be determined to discharge certain high power, and for example, 3 kW, 5 kW, or 7 kW is used when the rated value of the output limit Wout of the battery 50 is about 20 kW.

When it is determined in Step S410 that the output limit Wout of the battery 50 is equal to or greater than the threshold value Woutref, the HVECU 70 determines that the battery 50 can discharge certain high power, determines that execution of the power storage capacity decreasing control and the power storage capacity recovering control is permitted, sets the value of the permission flag F2 to 1 (Step S420), and ends this routine.

When it is determined in Step S410 that the output limit Wout of the battery 50 is less than the threshold value Woutref, the HVECU 70 determines that the battery 50 cannot discharge such high power, determines that execution of the power storage capacity decreasing control and the power storage capacity recovering control is prohibited, sets the value of the permission flag F2 to 0 (Step S430), and ends this routine.

When the power storage capacity decreasing control and the power storage capacity recovering control are executed, the battery 50 is likely to discharge relatively high power, particularly, at the time of execution of the power storage capacity decreasing control. When the output limit Wout of the battery 50 is less than the threshold value Woutref and the power storage capacity decreasing control and the power storage capacity recovering control are executed, a discharging power of the battery 50 is likely to be limited to the output limit Wout and there is a likelihood that energy efficiency of the vehicle as a whole will decrease. On the other hand, in this modified example, when the output limit Wout of the battery 50 is less than the threshold value Woutref, it is possible to curb a decrease in energy efficiency of the vehicle as a whole by prohibiting execution of the power storage capacity decreasing control and the power storage capacity recovering control.

Figure 9:
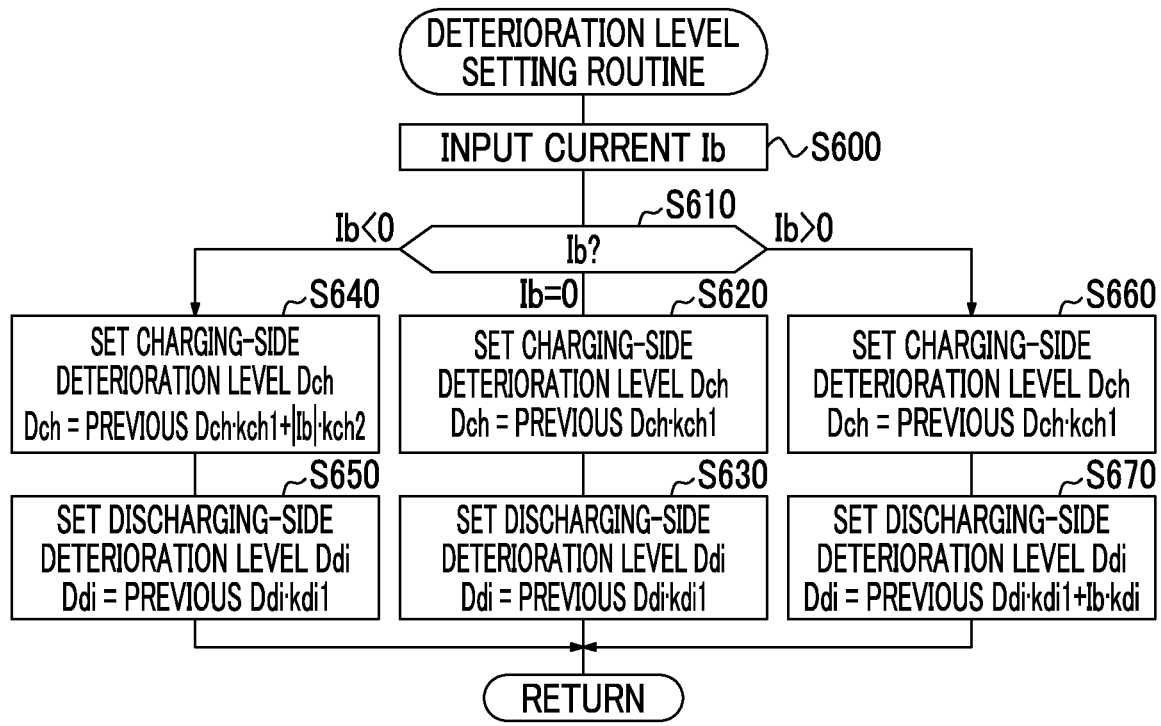
FIG. 9 is a flowchart illustrating an example of a deterioration level setting routine which is performed by a battery ECU 52.

The permission flag setting routine illustrated in FIG. 8 will be described now. When the permission flag setting routine illustrated in FIG. 8 is performed, the HVECU 70 receives a charging-side deterioration level Dch and a discharging-side deterioration level Ddi of the battery 50 (Step S500). Here, as a deterioration level Db of the battery 50, a value calculated by causing the battery ECU 52 to perform a deterioration level setting routine illustrated in FIG. 9 is input by communication. The permission flag setting routine illustrated in FIG. 8 will be temporarily stopped and the deterioration level setting routine illustrated in FIG. 9 will be described. This routine is repeatedly performed. The charging-side deterioration level Dch and the discharging-side deterioration level Ddi of the battery 50 are set to zero as initial values at the time of shipment or at the time of replacement of the battery 50.

When the deterioration level setting routine illustrated in FIG. 9 is performed, the battery ECU 52 receives the current Ib of the battery 50 detected by the current sensor 51b (Step S600) and compares the received current Ib of the battery 50 with the value of zero (Step S610). Then, when the current Ib of the battery 50 has the value of zero, a value obtained by multiplying a previous charging-side deterioration level (previous Dch) by a coefficient kch1 is set as a new charging-side deterioration level Dch as expressed by Equation (1) (Step S620), a value obtained by multiplying a previous discharging-side deterioration level (previous Ddi) by a coefficient kdi1 is set as a new discharging-side deterioration level Ddi as expressed by Equation (2) (Step S630), and this routine ends. Here, values which are greater than 0 and less than 1 are used as the coefficient kch1 and the coefficient kdi1. As the coefficient kch1 and the coefficient kdi1, values based on the power storage capacity SOC or the temperature Tb of the battery 50 may be used or fixed values may be used.

$$Dch = \text{previous } Dch \cdot kch1 \qquad (1)$$

$$Ddi = \text{previous } Ddi \cdot kdi1 \qquad (2)$$

When it is determined in Step S610 that the current Ib of the battery 50 has a negative value (a charging-side value), a sum of a value obtained by multiplying the previous charging-side deterioration level (previous Dch) by the coefficient kch1 and an integrated value of a product of the current Ib of the battery 50 and a coefficient kch2 is set as a new charging-side deterioration level Dch as expressed by Equation (3) (Step S640), the discharging-side deterioration level Ddi is set in the same way as the process of Step S630 (Step S650), and then this routine ends. Here, as the coefficient kch2, a value based on the power storage capacity SOC or the temperature Tb of the battery 50 may be used or a fixed value may be used.

$$Dch = \text{previous } Dch \cdot kch1 + |Ib| \cdot kch2 \qquad (3)$$

When it is determined in Step S610 that the current Ib of the battery 50 has a positive value (a discharging-side value), the charging-side deterioration level Dch is set in the same way as the process of Step S620 (Step S660), a sum of a value obtained by multiplying the previous discharging-side deterioration level (previous Ddi) by the coefficient kdi1 and an integrated value of a product of the current Ib of the battery 50 and a coefficient kdi2 is set as a new discharging-side deterioration level Ddi as expressed by Equation (4) (Step S670), and then this routine ends. Here, as the coefficient kdi2, a value based on the power storage capacity SOC or the temperature Tb of the battery 50 may be used or a fixed value may be used.

$$Ddi = \text{previous } Ddi \cdot kdi1 + Ib \cdot kdi2 \qquad (4)$$

The deterioration level setting routine illustrated in FIG. 9 has been described above. The permission flag setting routine illustrated in FIG. 8 will be described again. When the charging-side deterioration level Dch and the discharging-side deterioration level Ddi are input in Step S500, the input charging-side deterioration level Dch is compared with a threshold value Dchref (Step S510) and the discharging-side deterioration level Ddi is compared with a threshold value Ddiref (Step S520). Here, the threshold value Dchref or the threshold value Ddiref is a threshold value which is used to determine whether deterioration occurs in the battery 50.

When it is determined in Step S510 that the charging-side deterioration level Dch of the battery 50 is equal to or less than the threshold value Dchref and it is determined in Step S520 that the discharging-side deterioration level Ddi of the battery 50 is equal to or less than the threshold value Ddiref, it is determined that deterioration does not occur in the battery 50, it is determined that execution of the power storage capacity decreasing control and the power storage capacity recovering control is permitted, the permission flag F2 is set to 1 (Step S530), and then this routine ends.

When it is determined in Step S510 that the charging-side deterioration level Dch of the battery 50 is greater than the threshold value Dchref or it is determined in Step S520 that the discharging-side deterioration level Ddi of the battery 50 is greater than the threshold value Ddiref, it is determined that deterioration occurs in the battery 50, it is determined that execution of the power storage capacity decreasing control and the power storage capacity recovering control is prohibited, the permission flag F2 is set to 0 (Step S430), and then this routine ends.

As described above, when the power storage capacity decreasing control and the power storage capacity recovering control are executed, the battery 50 is likely to be charged and discharged with relatively high power in order to change the power storage capacity SOC of the battery 50. Accordingly, when deterioration occurs in the battery 50, deterioration of the battery 50 is likely to be accelerated. On the other hand, in this modified example, when deterioration occurs in the battery 50, it is possible to curb acceleration of deterioration of the battery 50 by prohibiting execution of the power storage capacity decreasing control and the power storage capacity recovering control.

In the hybrid vehicle 20 according to the embodiment or the modified examples, the permission flag F2 is set using the temperature Tb of the battery 50 in the permission flag setting routine illustrated in FIG. 5, the permission flag F2 is set using the input limit Win of the battery 50 in the permission flag setting routine illustrated in FIG. 6, the permission flag F2 is set using the output limit Wout of the battery 50 in the permission flag setting routine illustrated in FIG. 7, and the permission flag F2 is set using the charging-side deterioration level Dch or the discharging-side deterioration level Ddi of the battery 50 in the permission flag setting routine illustrated in FIG. 8. However, the permission flag F2 may be set using two or more of the temperature Tb of the battery 50, the input limit Win, the output limit Wout, the charging-side deterioration level Dch, and the discharging-side deterioration level Ddi. For example, when the temperature Tb of the battery 50 is equal to or greater than the threshold value Tblo and equal to or less than the threshold value Tbhi, the input limit Win of the battery 50 is equal to or less than the threshold value Winref, and the output limit Wout of the battery 50 is equal to or greater than the threshold value Woutref, the value of the permission flag F2 may be set to 1. When the temperature Tb of the battery 50 is less than the threshold value Tblo or greater than the threshold value Tbhi, the input limit Win of the battery 50 is greater (less in the absolute value) than the threshold value Winref, and the output limit Wout of the battery 50 is less than the threshold value Woutref, the value of the permission flag F2 may be set to 0.

Figure 10:
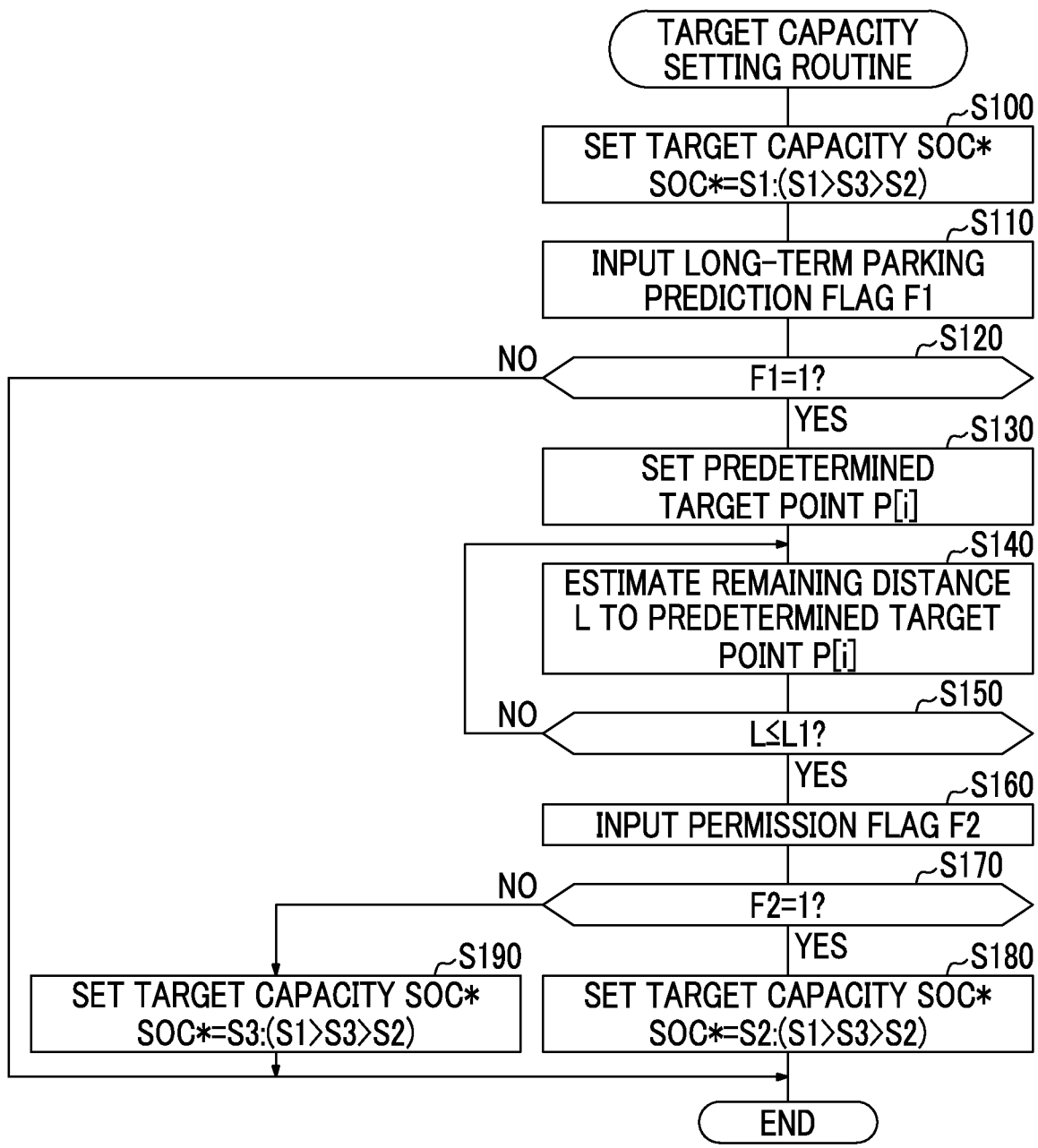
FIG. 10 is a flowchart illustrating an example of a target capacity setting routine according to a modified example.

In the hybrid vehicle 20 according to the embodiment or the modified examples, the HVECU 70 performs the target capacity setting routine illustrated in FIG. 3, but may perform a target capacity setting routine illustrated in FIG. 10. The target capacity setting routine illustrated in FIG. 10 is the same as the target capacity setting routine illustrated in FIG. 3, except that the process of Step S190 is added. Accordingly, the same processes will be referred to by the same step numbers and detailed description thereof will be omitted.

In the target capacity setting routine illustrated in FIG. 10, when it is determined in Step S170 that the value of the permission flag F2 is set to 0, the HVECU 70 sets the target capacity SOC* of the battery 50 to a predetermined value S3 which is less than the predetermined value S1 and greater than the predetermined value S2 (Step S190) and ends this routine. Here, as the predetermined value S3, a substantially median value between the predetermined value S1 and the predetermined value S2, for example, 54%, 55%, or 56%, is used. In this case, second power storage capacity decreasing control of limiting an amount of decreased power storage capacity SOC of the battery 50 compared with that in the power storage capacity decreasing control is executed in the current trip, and second power storage capacity recovering control of limiting an amount of recovered power storage capacity SOC of the battery 50 compared with that in the power storage capacity recovering control is executed in the next trip. The "second power storage capacity decreasing control" is specifically control of controlling the engine 22 or the motors MG1 and MG2 such that the power storage capacity SOC of the battery 50 changes from the vicinity of the predetermined value S1 to the vicinity of the predetermined value S3. The "second power storage capacity recovering control" is specifically control of controlling the engine 22 or the motors MG1 and MG2 such that the power storage capacity SOC of the battery 50 changes from the vicinity of the predetermined value S3 to the vicinity of the predetermined value S1 after the second power storage capacity decreasing control has been executed (in the next trip). In this case, when the value of the permission flag F2 is 0, it is possible to achieve substantially the same advantages as in the embodiment or the like in comparison with a case in which the power storage capacity decreasing control and the power storage capacity recovering control are executed.

The value of the permission flag F2, the values set in the permission flag setting routines illustrated in FIGS. 5 to 8 can be used as described above. Accordingly, a case in which the temperature Tb of the battery 50 is less than the threshold value Tblo or greater than the threshold value Tbhi, a case in which the input limit Win of the battery 50 is greater (less in the absolute value) than the threshold value Winref, a case in which the output limit Wout of the battery 50 is less than the threshold value Woutref, a case in which the charging-side deterioration level Dch of the battery 50 is greater than the threshold value Dchref, and a case in which the discharging-side deterioration level Ddi of the battery 50 is greater than the threshold value Ddhref can be considered as a case in which the value of the permission flag F2 is set to 0.

Figure 11:
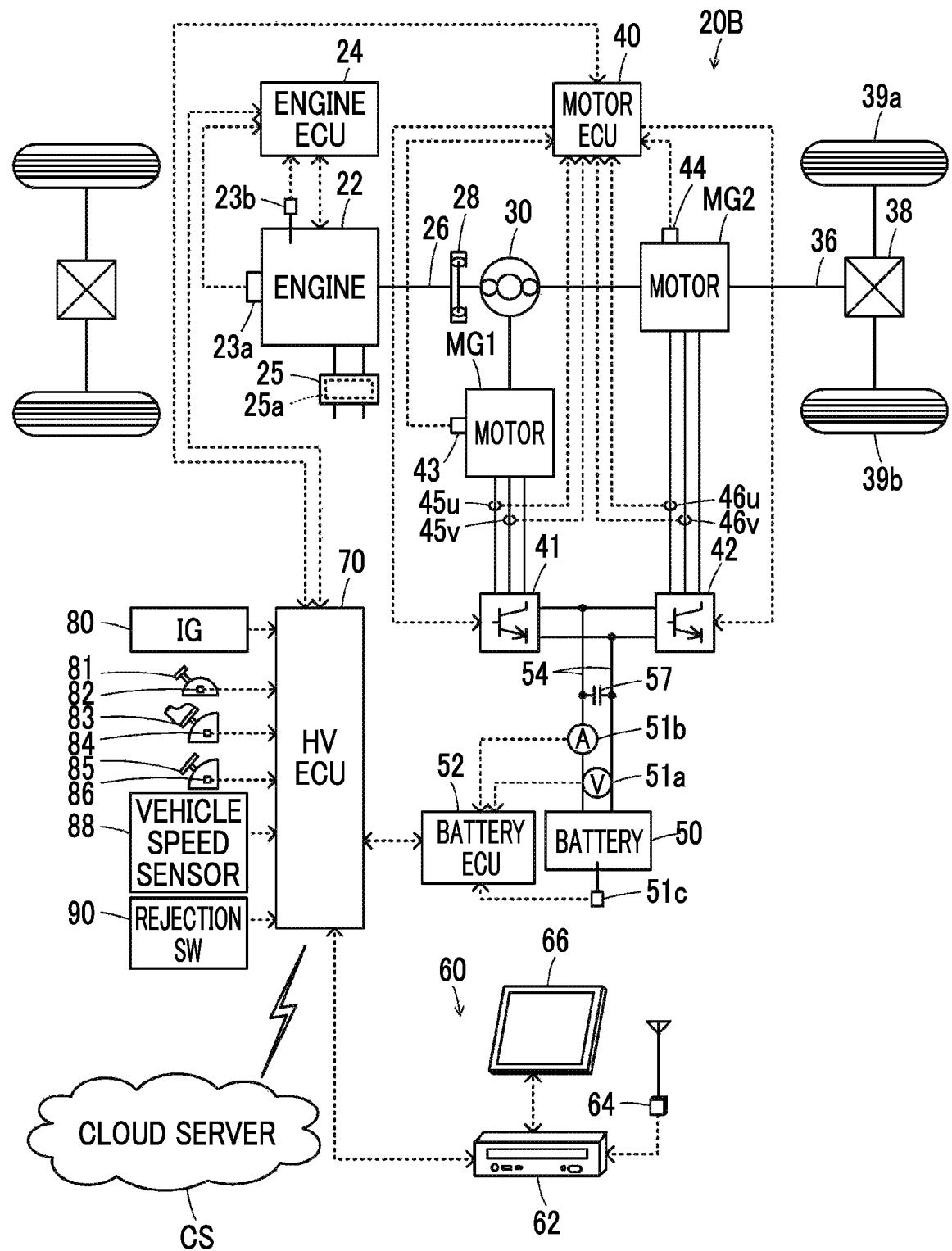
FIG. 11 is a diagram schematically illustrating a configuration of a hybrid vehicle 20B according to a modified example.

In the hybrid vehicle 20 according to the embodiment, although not particularly described, a rejection switch 90 that instructs to reject limiting (which includes prohibition) of execution of the power storage capacity decreasing control may be provided in addition to the configuration of the hybrid vehicle 20, as can be seen from a hybrid vehicle 20B according to a modified example illustrated in FIG. 11. In this case, a rejection signal from the rejection switch 90 is also input to the HVECU 70. In the configuration of the hybrid vehicle 20B, the HVECU 70 may perform a target capacity setting routine illustrated in FIG. 12 or 13 instead of the target capacity setting routine illustrated in FIG. 3 or 10. These routines will be sequentially described below.

Figure 12:
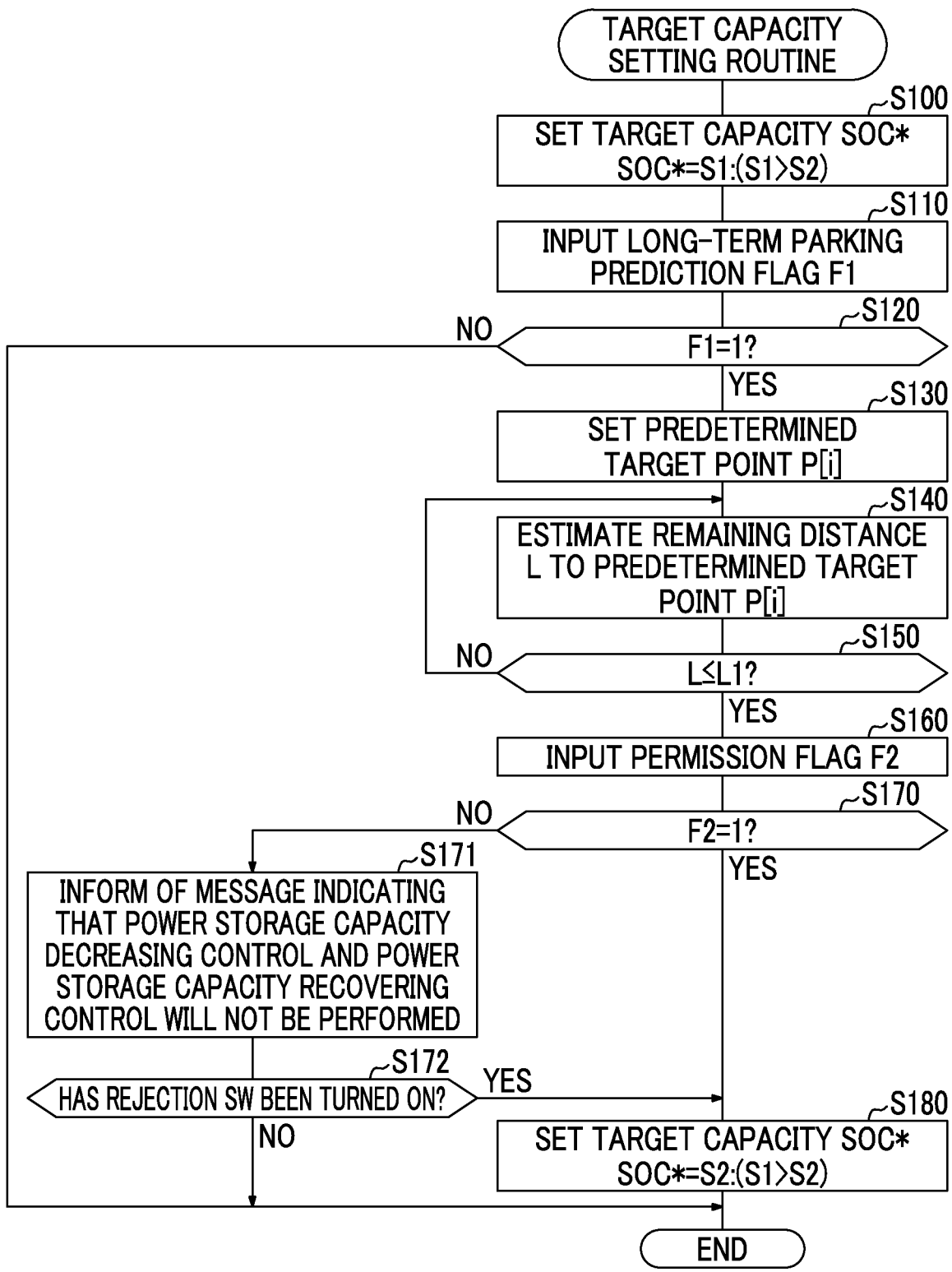
FIG. 12 is a flowchart illustrating an example of a target capacity setting routine according to a modified example.

The target capacity setting routine illustrated in FIG. 12 will be described. The target capacity setting routine illustrated in FIG. 12 is the same as the target capacity setting routine illustrated in FIG. 3, except that the processes of Steps S171 and S172 are added. Accordingly, the same processes will be referred to by the same step numbers and detailed description thereof will be omitted.

In the target capacity setting routine illustrated in FIG. 12, when it is determined in Step S170 that the value of the permission flag F2 is set to 0, the HVECU 70 notifies a user of a message indicating that the power storage capacity decreasing control will not be executed in the current trip and the power storage capacity recovering control will not be executed in the next trip by displaying the message on the display 66 or outputting sound indicating the message (Step S171) and checks whether the rejection switch 90 is turned on or off (Step S172). Then, when the rejection switch 90 is turned off, this routine ends. In this case, the power storage capacity decreasing control is not executed in the current trip and the power storage capacity recovering control will not be executed in the next trip.

When it is checked in Step S172 that the rejection switch 90 is turned on, the HVECU 70 sets the target capacity SOC* of the battery 50 to the predetermined value S2 less than the predetermined value S1 (Step S180) and ends this routine. In this case, the power storage capacity decreasing control is executed in the current trip and the power storage capacity recovering control is executed in the next trip. When the value of the permission flag F2 is 0 and the rejection switch 90 is turned on, it is possible to reflect a user's intention and to execute the power storage capacity decreasing control and the power storage capacity recovering control. Since a user is notified that a message indicating that the power storage capacity decreasing control and the power storage capacity recovering control will not be executed, the user can recognize the message and select whether to turn on the rejection switch 90.

Figure 13:
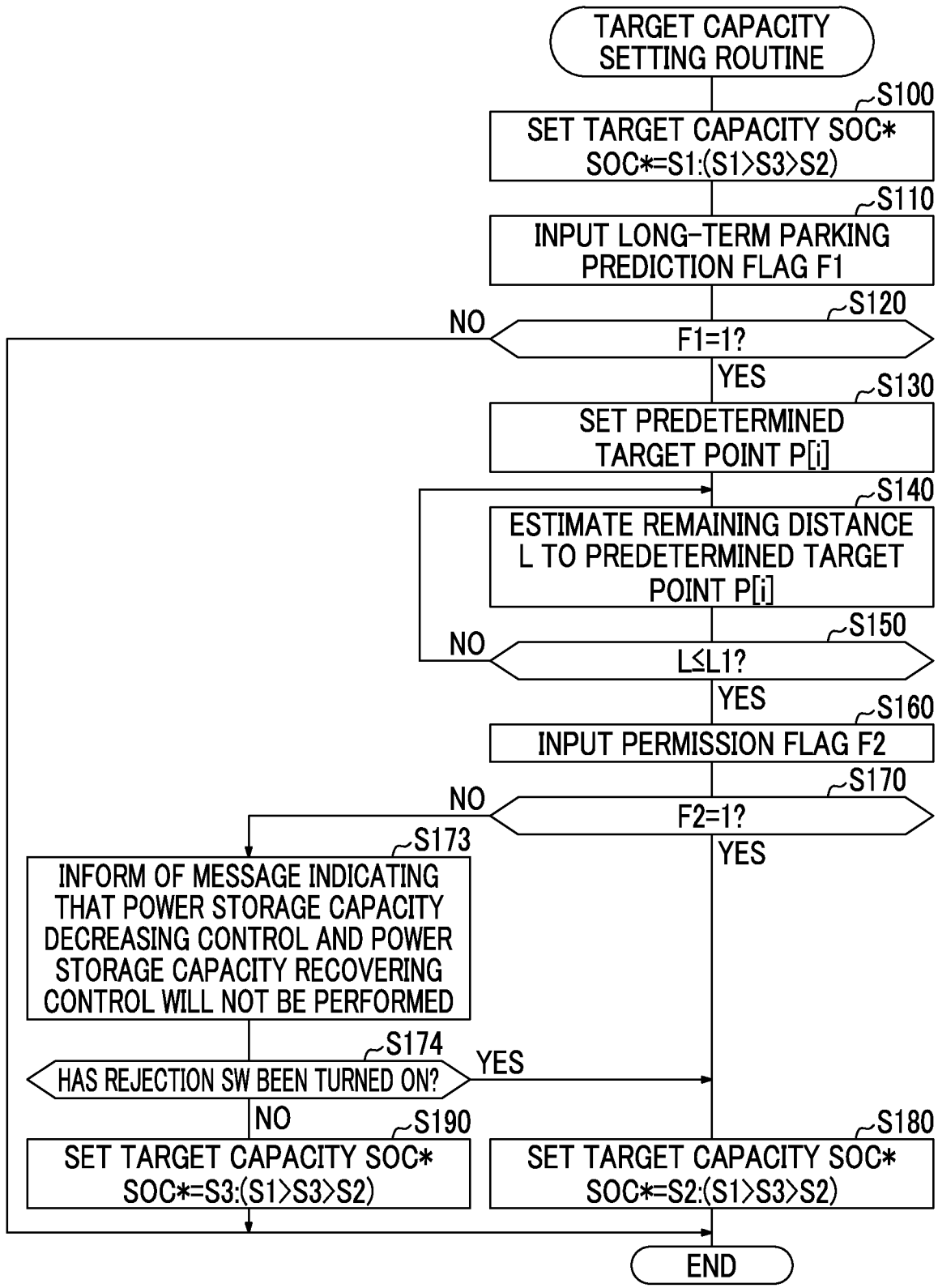
FIG. 13 is a flowchart illustrating an example of a target capacity setting routine according to a modified example.

The target capacity setting routine illustrated in FIG. 13 will be described. The target capacity setting routine illustrated in FIG. 13 is the same as the target capacity setting routine illustrated in FIG. 10, except that the processes of Steps S173 and S174 are added. Accordingly, the same processes will be referred to by the same step numbers and detailed description thereof will be omitted.

In the target capacity setting routine illustrated in FIG. 13, when it is determined in Step S170 that the value of the permission flag F2 is set to 0, the HVECU 70 notifies a user of a message indicating that the power storage capacity decreasing control will not be executed in the current trip and the power storage capacity recovering control will not be executed in the next trip (the second power storage capacity decreasing control is executed in the current trip and the second power storage capacity recovering control will be executed in the next trip) by displaying the message on the display 66 or outputting sound indicating the message (Step S173) and checks whether the rejection switch 90 is turned on or off (Step S174). Then, when the rejection switch 90 is turned off, the target capacity SOC* of the battery 50 is set to the predetermined value S3 (Step S190) and then this routine ends. In this case, the second power storage capacity decreasing control is executed in the current trip and the second power storage capacity recovering control will be executed in the next trip.

When it is checked in Step S174 that the rejection switch 90 is turned on, the HVECU 70 sets the target capacity SOC* of the battery 50 to the predetermined value S2 less than the predetermined value S1 (Step S180) and ends this routine. In this case, the power storage capacity decreasing control is executed in the current trip and the power storage capacity recovering control is executed in the next trip. When the value of the permission flag F2 is 0 and the rejection switch 90 is turned on, it is possible to reflect a user's intention and to execute the power storage capacity decreasing control and the power storage capacity recovering control. Since a user is notified that a message indicating that the power storage capacity decreasing control and the power storage capacity recovering control will not be executed, the user can recognize the message and select whether to turn on the rejection switch 90.

In the hybrid vehicle 20 according to the embodiment, as the power storage capacity decreasing control, the target capacity SOC* of the battery 50 is set to the predetermined value S2 which is less than the predetermined value S1 when the power storage capacity decreasing control is not executed. However, the disclosure is not limited to the target capacity SOC* of the battery 50, but a starting capacity SOCst as a starting power storage capacity SOC of the engine 22 for forcibly charging the battery 50 may be set to a value less than that when the power storage capacity decreasing control is not executed.

In the hybrid vehicle 20 according to the embodiment, as the power storage capacity decreasing control, the target capacity SOC* of the battery 50 is set to the predetermined value S2 which is less than the predetermined value S1 when the power storage capacity decreasing control is not executed. However, instead of or in addition to the power storage capacity decreasing control, a stopping threshold value Pstop or a starting threshold value Pstart may be set to a value greater than that when the power storage capacity decreasing control is not executed. As long as they are starting and stopping threshold values associated with a traveling output for the vehicle, the disclosure is not limited to the stopping threshold value Pstop or the starting threshold value Pstart for the required power Pe*, but starting and stopping threshold values for the accelerator operation amount Acc, starting and stopping threshold values for the vehicle speed V, starting and stopping threshold values for the required torque Td*, starting and stopping threshold values for the required power Pd*, starting and stopping threshold values for an actual torque Td of the drive shaft 36, starting and stopping threshold values for an actual power Pd of the drive shaft 36, starting and stopping threshold values for an actual power Pe of the engine 22, and the like may be set to values greater than those when the power storage capacity decreasing control is not executed as the power storage capacity decreasing control.

In the hybrid vehicle 20 according to the embodiment, the onboard navigation device 60 sets a destination, sets a scheduled traveling route from a current location of the vehicle to a destination, or performs route guidance for the scheduled traveling route. However, a mobile terminal (for example, a smartphone or a tablet) that can wirelessly communicate with the HVECU 70 may set a destination, set a scheduled traveling route from a current location of the vehicle to a destination, or perform route guidance for the scheduled traveling route. In this case, in the target capacity setting routine illustrated in FIG. 3, a destination may be input from the mobile terminal instead of inputting a destination from the onboard navigation device 60.

The hybrid vehicle 20 according to the embodiment includes the onboard navigation device 60, but may not include the onboard navigation device 60.

The hybrid vehicle 20 according to the embodiment is a vehicle that does not include a connector capable of being connected to an external power supply, that is, a vehicle which cannot be subjected to external charging which is charging of the battery 50 using electric power from the external power supply. However, the hybrid vehicle 20 may be a vehicle which can be subjected to external charging. In this case, it is preferable that a position at which external charging is not available be set (registered) as the predetermined position. This is because there is little necessity for power storage capacity decreasing control before long-term parking when the vehicle is subjected to external charging during long-term parking at the predetermined point.

In the hybrid vehicle 20 according to the embodiment, the battery 50 is used as a power storage device, but a capacitor may be used instead of the battery 50.

The hybrid vehicle 20 according to the embodiment includes the engine ECU 24, the motor ECU 40, the battery ECU 52, and the HVECU 70, but at least two thereof may be configured as a single electronic control unit.

Figure 14:
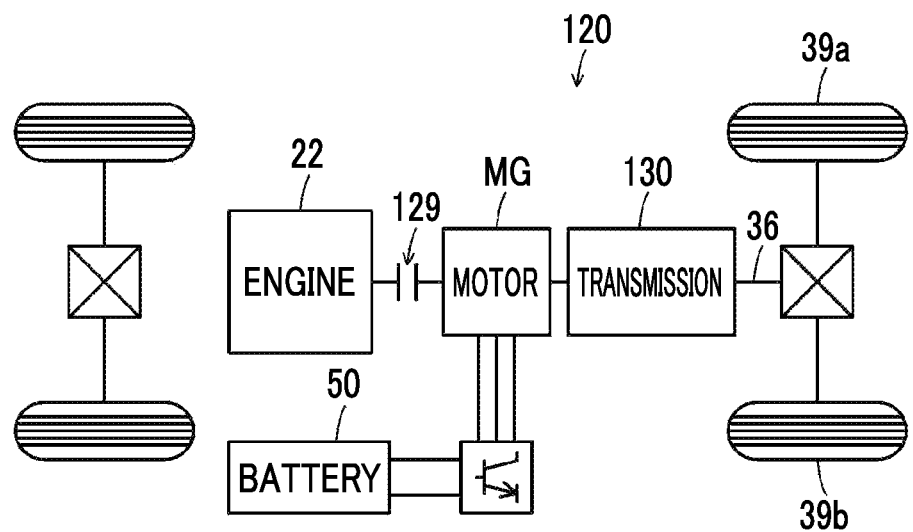
FIG. 14 is a diagram schematically illustrating a configuration of a hybrid vehicle 120 according to a modified example.
Figure 15:
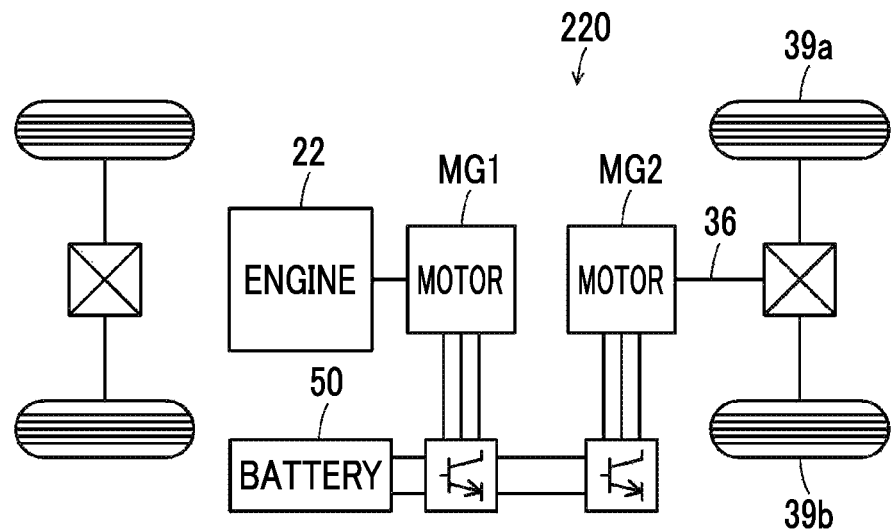
FIG. 15 is a diagram schematically illustrating a configuration of a hybrid vehicle 220 according to a modified example.

In the hybrid vehicle 20 according to the embodiment, a configuration in which the engine 22 and the motor MG1 are connected to the drive shaft 36 connected to the driving wheels 39a and 39b via the planetary gear 30, the motor MG2 is connected to the drive shaft 36 and the battery 50 is connected to the motors MG1 and MG2 via a power line has been employed. However, as can be seen from a hybrid vehicle 120 according to a modified example illustrated in FIG. 14, a configuration of a so-called single-motor hybrid vehicle in which a motor MG is connected to the drive shaft 36 connected to the driving wheels 39a and 39b via a transmission 130, the engine 22 is connected to the motor MG via a clutch 129, and the battery 50 is connected to the motor MG via a power line may be employed. As can be seen from a hybrid vehicle 220 according to a modified example illustrated in FIG. 15, a configuration of a so-called series hybrid vehicle in which a power-generating motor MG1 is connected to the engine 22, a traveling motor MG2 is connected to the drive shaft 36 connected to the driving wheels 39a and 39b, and the battery 50 is connected to the motors MG1 and MG2 via a power line may be employed.

In the embodiment, the invention is embodied as the hybrid vehicle 20, but may be embodied as a controller mounted in the hybrid vehicle 20. In this case, the HVECU 70, the engine ECU 24, the motor ECU 40, and the battery ECU 52 are an example of a "controller."

Correspondence between principal elements of the embodiment and principal elements of the disclosure described in the SUMMARY will be described below. In the embodiment, the engine 22 is an example of an "engine." The motor MG1 or the motor MG2 is an example of a "motor." The battery 50 is an example of a "power storage device." The HVECU 70, the engine ECU 24, the motor ECU 40, and the battery ECU 52 are examples of a "controller."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY That is, it should be noted that the disclosure described in the SUMMARY has to be construed based on the description of the SUMMARY and the embodiment is only a specific example of the disclosure described in the SUMMARY.

While an embodiment of the invention has been described above, the disclosure is not limited to the embodiment and can be modified in various forms without departing from the gist of the disclosure.

The disclosure is applicable to industries for manufacturing hybrid vehicles and controllers mounted therein.

What is claimed is:

1. A hybrid vehicle comprising:
   an engine;
   a motor;
   a power storage device connected to the motor; and
   an electronic control unit configured to,
   i) when a condition a) is satisfied, execute power storage capacity decreasing control in a current trip and execute power storage capacity recovering control in a next trip, and
   ii) limit execution of the power storage capacity decreasing control and execution of the power storage capacity recovering control to a greater extent when the condition a) and a condition b) are both satisfied than when the condition a) and a condition c) are both satisfied,
      a) parking at a predetermined point is predicted,
      b) a temperature of the power storage device is out of a predetermined temperature range, and
      c) the temperature of the power storage device is within the predetermined temperature range,
   the power storage capacity decreasing control being control of controlling the engine and the motor such that a power storage capacity of the power storage device is lower when the condition a) is satisfied than when the condition a) is not satisfied,
   the power storage capacity recovering control being control of controlling the engine and the motor such that the power storage capacity of the power storage device is recovered when the engine operates.

2. The hybrid vehicle according to claim 1, wherein the electronic control unit is configured to prohibit execution of the power storage capacity decreasing control and execution of the power storage capacity recovering control when the condition a) and the condition b) are both satisfied.

3. The hybrid vehicle according to claim 1, wherein the electronic control unit is configured to notify of a message indicating limiting of execution of the power storage capacity decreasing control and execution of the power storage capacity recovering control when a condition f) is satisfied,
   f) execution of the power storage capacity decreasing control and execution of the power storage capacity recovering control are scheduled to be limited.

4. The hybrid vehicle according to claim 1, wherein the electronic control unit is configured not to limit execution of the power storage capacity decreasing control and the power storage capacity recovering control when the condition f) and a condition g) are both satisfied,
   g) rejection of limiting of execution of the power storage capacity decreasing control is instructed.

5. The hybrid vehicle according to claim 1, wherein the electronic control unit is configured to determine whether parking at the predetermined point is predicted based on whether a destination is the predetermined point, and
   the electronic control unit is configured to acquire a destination that is predicted based on a traveling history by an external system when a destination has not been set by a user.

6. The hybrid vehicle according to claim 1, wherein
the hybrid vehicle is a vehicle that is not able to use external charging, the external charging is charging of the power storage device using electric power from an external power supply.

7. The hybrid vehicle according to claim 1, wherein
the hybrid vehicle is a vehicle that is able to use external charging, the external charging is charging of the power storage device using electric power from an external power supply,
the predetermined point being a position at which the vehicle is predicted not to use external charging.

8. A hybrid vehicle comprising:
an engine;
a motor;
a power storage device that is connected to the motor; and
an electronic control unit configured to,
i) when a condition a) is satisfied, execute power storage capacity decreasing control in a current trip and execute power storage capacity recovering control in a next trip, and
ii) when the condition a) is satisfied, limit execution of the power storage capacity decreasing control and execution of the power storage capacity recovering control to a greater extent as an absolute value of a predetermined power of the power storage device decreases,
a) parking at a predetermined point is predicted,
the power storage capacity decreasing control being control of controlling the engine and the motor such that a power storage capacity of the power storage device is lower when the condition a) is satisfied than when the condition a) is not satisfied,
the power storage capacity recovering control being control of controlling the engine and the motor such that the power storage capacity of the power storage device is recovered when the engine operates,
the absolute value of the predetermined power is one of an absolute value of an allowable input power and an absolute value of an allowable output power.

9. The hybrid vehicle according to claim 8, wherein
the electronic control unit is configured to prohibit execution of the power storage capacity decreasing control and execution of the power storage capacity recovering control when the condition a) and a condition d) are both satisfied,
d) the predetermined power of the power storage device is less than a threshold value.

10. A hybrid vehicle comprising:
an engine;
a motor;
a power storage device that is connected to the motor; and
an electronic control unit configured to,
i) when a condition a) is satisfied, execute power storage capacity decreasing control in a current trip and execute power storage capacity recovering control in a next trip, and
ii) when the condition a) is satisfied, limit execution of the power storage capacity decreasing control and execution of the power storage capacity recovering control to a greater extent as a deterioration level of the power storage device increases,
a) parking at a predetermined point is predicted,
the power storage capacity decreasing control being control of controlling the engine and the motor such that a power storage capacity of the power storage device is lower when the condition a) is satisfied than when the condition a) is not satisfied,
the power storage capacity recovering control being control of controlling the engine and the motor such that the power storage capacity of the power storage device is recovered when the engine operates.

11. The hybrid vehicle according to claim 10, wherein
the electronic control unit is configured to limit execution of the power storage capacity decreasing control and execution of the power storage capacity recovering control when the condition a) and a condition e) are both satisfied,
e) the deterioration level of the power storage device is larger than a predetermined deterioration level.

12. A controller for a hybrid vehicle,
the hybrid vehicle including an engine, a motor, and a power storage device connected to the motor, the controller comprising:
an electronic control unit configured to,
i) when a condition a) is satisfied, execute power storage capacity decreasing control in a current trip and execute power storage capacity recovering control in a next trip, and
ii) limit execution of the power storage capacity decreasing control and execution of the power storage capacity recovering control to a greater extent when the condition a) and a condition b) are both satisfied than when the condition a) and a condition c) are both satisfied,
a) parking at a predetermined point is predicted,
b) a temperature of the power storage device is out of a predetermined temperature range, and
c) the temperature of the power storage device is within the predetermined temperature range,
the power storage capacity decreasing control being control of controlling the engine and the motor such that a power storage capacity of the power storage device is lower than when the condition a) is satisfied when the condition a) is not satisfied,
the power storage capacity recovering control being control of controlling the engine and the motor such that the power storage capacity of the power storage device is recovered when the engine operates.

13. A controller for a hybrid vehicle, the hybrid vehicle including an engine, a motor, a power storage device that is connected to the motor, the controller comprising:
an electronic control unit configured to,
i) when a condition a) is satisfied, execute power storage capacity decreasing control in a current trip and execute power storage capacity recovering control in a next trip, and
ii) when the condition a) is satisfied, limit execution of the power storage capacity decreasing control and execution of the power storage capacity recovering control to a greater extent as an absolute value of a predetermined power of the power storage device decreases,
a) parking at a predetermined point is predicted,
the power storage capacity decreasing control being control of controlling the engine and the motor such that a power storage capacity of the power storage device is lower than when the condition a) is satisfied when the condition a) is not satisfied,
the power storage capacity recovering control being control of controlling the engine and the motor such that the power storage capacity of the power storage device is recovered when the engine operates,
the absolute value of the predetermined power is one of an absolute value of an allowable input power and an absolute value of an allowable output power.

14. A controller for a hybrid vehicle, the hybrid vehicle including an engine, a motor, and a power storage device that is connected to the motor, the controller comprising:
an electronic control unit configured to,
i) when a condition a) is satisfied, execute power storage capacity decreasing control in a current trip and execute power storage capacity recovering control in a next trip, and
ii) when the condition a) is satisfied, limit execution of the power storage capacity decreasing control and execution of the power storage capacity recovering control to a greater extent as a deterioration level of the power storage device increases,
a) parking at a predetermined point is predicted,
the power storage capacity decreasing control being control of controlling the engine and the motor such that a power storage capacity of the power storage device is lower when the condition a) is satisfied than that when the condition a) is not satisfied,
the power storage capacity recovering control being control of controlling the engine and the motor such that the power storage capacity of the power storage device is recovered when the engine operates.

* * * * *